US 10,858,986 B2

(12) United States Patent
Yoshida et al.

(10) Patent No.: US 10,858,986 B2
(45) Date of Patent: Dec. 8, 2020

(54) TURBOCHARGER, TWO-STAGE TURBO SYSTEM, AND CONTROL METHOD FOR TWO-STAGE TURBO SYSTEM

(71) Applicant: MITSUBISHI HEAVY INDUSTRIES, LTD., Tokyo (JP)

(72) Inventors: Toyotaka Yoshida, Tokyo (JP); Kunihiro Tomikawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 46 days.

(21) Appl. No.: 16/080,269

(22) PCT Filed: Mar. 3, 2017

(86) PCT No.: PCT/JP2017/008573
§ 371 (c)(1),
(2) Date: Aug. 27, 2018

(87) PCT Pub. No.: WO2017/169517
PCT Pub. Date: Oct. 5, 2017

(65) Prior Publication Data
US 2019/0078504 A1 Mar. 14, 2019

(30) Foreign Application Priority Data
Mar. 30, 2016 (JP) ................. 2016-068504

(51) Int. Cl.
*F02B 37/00* (2006.01)
*F02B 37/02* (2006.01)
(Continued)

(52) U.S. Cl.
CPC .......... *F02B 37/025* (2013.01); *F02B 37/004* (2013.01); *F02B 37/013* (2013.01);
(Continued)

(58) Field of Classification Search
CPC ...... F02B 37/025; F02B 37/013; F02B 37/02; F02B 37/004; F02B 37/183; F02B 37/22; F02B 37/18; F01D 9/026; Y02T 10/144
(Continued)

(56) References Cited

U.S. PATENT DOCUMENTS 2,635,849 A * 4/1953 Buchi ............... F01D 9/026
                                                415/184
4,008,010 A * 2/1977 Fauconnet ........... F03B 3/10
                                                417/405
(Continued)

FOREIGN PATENT DOCUMENTS

DE      4242494 C1   9/1993
EP      2096264 A2   9/2009
(Continued)

OTHER PUBLICATIONS

International Preliminary Report on Patentability and Written Opinion of the International Searching Authority(Forms PCT/IB/338, PCT/IB/373 and PCT/ISA/237), dated Oct. 11, 2018, for International Application No. PCT/JP2017/008573, with an English Translation of the Written Opinion.
(Continued)

*Primary Examiner* — Thai Ba Trieu
*Assistant Examiner* — Dapinder Singh
(74) *Attorney, Agent, or Firm* — Birch, Stewart, Kolasch & Birch, LLP

(57) ABSTRACT

A turbocharger includes: at least two scroll passages, and a first range of the nozzle flow passage into which the exhaust gas flowing through the first scroll passage is introduced does not overlap with a second range of the nozzle flow passage into which the exhaust gas flowing through the second scroll passage is introduced, in a circumferential direction of the nozzle flow passage. The first scroll passage
(Continued)

includes: a division wall disposed along a flow direction of the exhaust gas within a predetermined range in the first scroll passage, the division wall dividing the first scroll passage into a radially outer side scroll passage and a radially inner side scroll passage positioned on a radially inner side of the radially outer side scroll passage, and having a communication hole which brings the radially outer side scroll passage and the radially inner side scroll passage into communication; and a flow-rate control valve disposed on an upstream side of the division wall, for adjusting a flow rate of the exhaust gas flowing through the radially outer side scroll passage and the radially inner side scroll passage.

17 Claims, 12 Drawing Sheets

(51) Int. Cl.
      *F02B 37/18*      (2006.01)
      *F02B 37/22*      (2006.01)
      *F02B 37/013*     (2006.01)
      *F01D 9/02*       (2006.01)

(52) U.S. Cl.
      CPC .............. *F02B 37/02* (2013.01); *F02B 37/18* (2013.01); *F02B 37/183* (2013.01); *F02B 37/22* (2013.01); *F01D 9/026* (2013.01); *Y02T 10/12* (2013.01)

(58) Field of Classification Search
      USPC ..... 60/602, 605.2, 605.1, 611, 612; 123/562
      See application file for complete search history.

(56) References Cited

U.S. PATENT DOCUMENTS

| | | | |
|---|---|---|---|
| 4,729,715 A | | 3/1988 | Wilde |
| 6,073,447 A * | | 6/2000 | Kawakami ............. F01D 9/026 60/602 |
| 6,260,358 B1 * | | 7/2001 | Daudel ................... F02B 37/02 415/42 |
| 7,644,585 B2 | | 1/2010 | Haugen |
| 8,671,682 B2 | | 3/2014 | Parlow et al. |
| 2005/0056015 A1 * | | 3/2005 | Fledersbacher ....... F01D 17/143 60/602 |
| 2006/0042247 A1 * | | 3/2006 | Haugen .................. F01D 9/026 60/612 |
| 2007/0079612 A1 | | 4/2007 | Grissom |
| 2009/0220335 A1 | | 9/2009 | Matsuo et al. |
| 2011/0296828 A1 | | 12/2011 | An et al. |
| 2012/0210711 A1 * | | 8/2012 | Petrovic ................ F02B 37/013 60/602 |
| 2016/0025044 A1 | | 1/2016 | Martinez-Botas et al. |

FOREIGN PATENT DOCUMENTS

| | | |
|---|---|---|
| FR | 1314780 A | 1/1963 |
| GB | 2 178 111 A | 2/1987 |
| JP | 10-8977 A | 1/1998 |
| JP | 2005-133665 A | 5/2005 |
| JP | 2005-527728 A | 9/2005 |
| JP | 2008-514842 A | 5/2008 |
| JP | 2009-209701 A | 9/2009 |
| JP | 2010-190070 A | 9/2010 |
| WO | WO 2010/097979 A1 | 9/2010 |
| WO | WO 2014/140598 A1 | 9/2014 |

OTHER PUBLICATIONS

International Search Report (Forms PCT/ISA/220 and PCT/ISA/210), dated Jun. 6, 2017, for International Application No. PCT/JP2017/008573.
Extended European Search Report, dated Sep. 9, 2019, for European Application No. 17774062.8.
Japanese Office Action, dated Sep. 24, 2019, for Japanese Application No. 2016-068504, along with an English translation.
Office Action dated Dec. 4, 2019 issued in the corresponding Chinese Application No. 201780012961.6
Office Action dated Feb. 4, 2020 issued to the corresponding Japanese Application No. 2016-068504 with an English Translation.
Chinese Office Action for Chinese Application No. 201780012961.6, dated May 8, 2020, with English machine translation.
European Communication pursuant to Article 94(3) EPC for European Application No. 17774062.8, dated May 28, 2020.

* cited by examiner

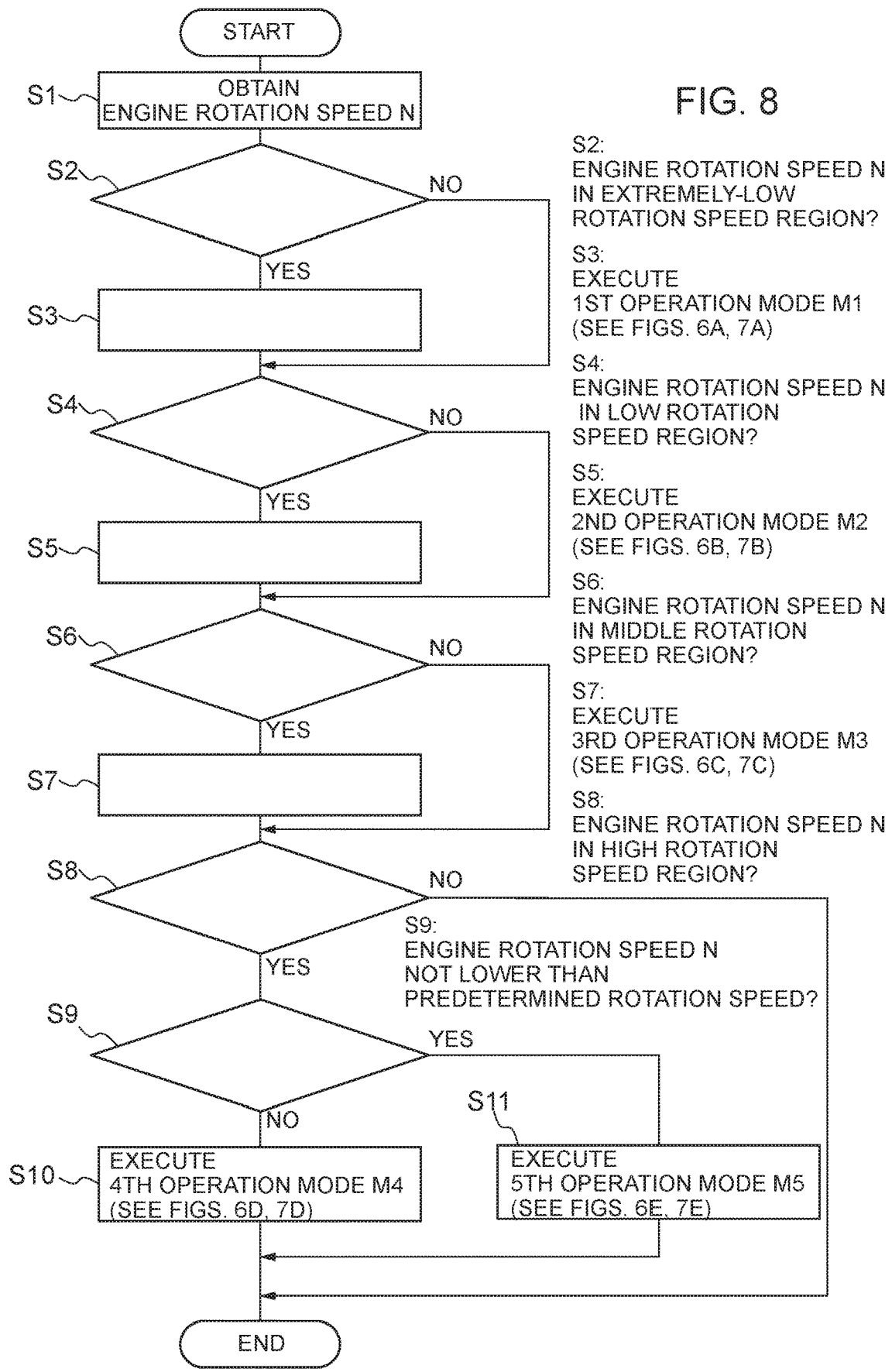

TURBOCHARGER, TWO-STAGE TURBO SYSTEM, AND CONTROL METHOD FOR TWO-STAGE TURBO SYSTEM

TECHNICAL FIELD

The present disclosure relates to a turbocharger, a two-stage turbo system, and a control method for the two-stage turbo system.

BACKGROUND ART

A two-stage turbo system is known as a supercharging system that can be applied to an engine such as a diesel engine. A two-stage turbo system is regarded as a promising supercharging system which can be applied to an existing diesel engine without adding extensive modification, which can achieve both torque up and high output at a low speed, and which has an improved response (transient response performance). More specifically, a two-stage turbo system includes a high-pressure stage turbocharger and a low-pressure stage connected in series, whereby it is possible to switch stages of supercharging through switching of the flow passage of the exhaust passage by controlling the opening degree of various valves disposed in the exhaust passage. Further, by switching supercharging between the single stage supercharging and the two-stage supercharging in accordance with the operational conditions of the engine, it is possible to improve the response at a low speed while generating a necessary boost pressure over a broad operational range of the engine. Generally, exhaust gas has a small flow rate when the engine is at a low speed, and the flow passage of the exhaust gas is switched so that two-stage supercharging is performed by allowing the exhaust gas to flow through the high-pressure stage turbocharger and the low-pressure stage turbocharger in this order. Furthermore, while the two-stage supercharging is also performed when the engine is at a middle speed, the exhaust passage is switched so as to allow a part of exhaust gas to flow directly to the low-pressure stage turbocharger without passing through the high-pressure stage turbocharger. Further, when the engine is at a high speed, the flow passage of the exhaust gas is switched so that one-stage supercharging is performed by allowing the entire exhaust gas, which has a high flow rate, to flow into the low-pressure stage turbocharger directly.

Further, a small-sized turbocharger is mounted to the high-pressure stage side of the two-stage turbo system, and a large-sized turbocharger is mounted to the low-pressure stage side. Accordingly, it is possible to expand the operational range of the compressor by making use of the range of the low flow rate side of the high-pressure stage turbocharger and the range of the high flow rate side of the low-pressure stage turbocharger. However, the large-sized turbine of the low-pressure stage turbocharger has a greater weight than a small-sized turbine, and thus the rotation speed of the turbine is less likely to increase when the engine is at a low speed. That is, the response performance of the turbine of the low-pressure stage turbocharger deteriorates when the engine is at a low speed, and the boost pressure required when the engine is at a low speed is mainly covered by the high-pressure stage turbocharger. In view of this, proposed is a method for improving the response of the low-pressure stage turbocharger at the time when the engine is at a low speed, while maintaining the flow rate range of the low-pressure stage turbocharger (Patent Documents 1 and 2).

For instance, Patent Document 1 discloses providing a VG turbocharger as the low-pressure stage turbocharger. A VG turbocharger has a variable nozzle vane mechanism (flow rate variable mechanism) on the turbine side, and it is possible to improve the response by narrowing the nozzle opening degree of the variable nozzle at the low speed time of the engine. For instance, Patent Document 2 proposes applying a twin scroll to a scroll part of the low-pressure stage turbocharger. When a twin scroll is applied, a scroll part formed along the circumferential direction of the rotational axis of a turbine has a structure with two passages extending in the axial direction of the rotational axis, whereby the flow rate of exhaust gas is introduced into the turbine through two separate passages, which makes it possible to drive the turbine without attenuating the pressure of the exhaust gas.

Further, a VTF turbine is known as a simply-structured turbine having a flow rate variable mechanism (Patent Document 3). The turbine includes a division wall which divides the scroll part in the radial direction into a radially inner side scroll passage and a radially outer side scroll passage, a communication hole (throat) which brings the scroll passages into communication, and a switching valve for switching whether exhaust gas flows into the radially inner side scroll passage or into both of the scroll passages. The switch valve switches the passage of exhaust gas depending on the flow rate of exhaust gas. According to the above technique, when the flow rate of exhaust gas is low, the switch valve is operated to allow exhaust gas to flow into only the radially inner side scroll passage, and thereby it is possible to apply a rotational torque to the turbine rotor and rotate the turbine rotor efficiently. Furthermore, when the flow rate of exhaust gas is high, the switch valve is operated to allow exhaust gas to flow also into the radially outer side scroll passage, and thereby it is also possible to reduce the flow velocity of exhaust gas and reduce the rotational torque applied to the turbine rotor, thus preventing excessive rotation of the turbine rotor.

CITATION LIST

Patent Literature

Patent Document 1: U.S. Pat. No. 8,671,682B
Patent Document 2: US2007/0079612A
Patent Document 3: JPH10-8977A

SUMMARY

Problems to be Solved

Meanwhile, for the VG turbo disclosed in Patent Document 1 a complicated link mechanism is required to open and close the nozzle vanes, and the structure may become complicated. Furthermore, in a case where a twin scroll of the Patent Document 2 is provided, the U/C0 property (see FIG. 4 described below) of the turbocharger is similar to that of a turbocharger with a single scroll, and remarkable improvement of response at the time when engine is at a low speed cannot be expected. The U/C0 property refers to a property representing the relationship between the turbine operation speed ratio (U/C0) and the turbine efficiency, where U is the circumferential speed of the turbine T, C0 is a theoretical speed defined from a pressure ratio of the inlet and the outlet of the turbine and the inlet temperature. Further, even if the VFT turbine of Patent Document 3 is applied to the two-stage turbo system, the U/C0 property of the VFT turbine does not have a high turbine efficiency in a region where the turbine operation speed ratio (U/C0) is small (low speed ratio side), and thus remarkable improvement of response cannot be expected, similarly to the twin scroll.

In view of the above, an object of at least one embodiment of the present invention is to provide a turbocharger with an improved supercharging response, whereby it is possible to generate a necessary boost pressure over a broad operational range of an engine, and a two-stage turbo system including the turbocharger.

Solution to the Problems (1) A turbocharger according to at least one embodiment of the present invention includes: a scroll part for introducing exhaust gas into a nozzle flow passage of a turbine disposed in an exhaust passage of a engine. The scroll part includes at least two scroll passages including a first scroll passage and a second scroll passage, and is configured such that a first range of the nozzle flow passage into which the exhaust gas flowing through the first scroll passage is introduced does not overlap with a second range of the nozzle flow passage into which the exhaust gas flowing through the second scroll passage is introduced, in a circumferential direction of the nozzle flow passage. The first scroll passage includes: a division wall disposed along a flow direction of the exhaust gas within a predetermined range in the first scroll passage, the division wall dividing the first scroll passage into a radially outer side scroll passage and a radially inner side scroll passage positioned on a radially inner side of the radially outer side scroll passage, and having a communication hole which brings the radially outer side scroll passage and the radially inner side scroll passage into communication; and a flow-rate control valve disposed on an upstream side of the division wall, for adjusting a flow rate of the exhaust gas flowing through the radially outer side scroll passage and the radially inner side scroll passage.

With the above configuration (1), the scroll part of turbine of the turbocharger includes, at least, the first scroll passage and the second scroll passage. Further, the first scroll passage is divided (formed) into the radially outer side scroll passage and the radially inner side scroll passage, and the flow rate of the two passages is adjustable. Herein, each of the first scroll passage and the second scroll passage is configured to introduce exhaust gas partially from different directions into the nozzle flow passage formed around the turbine wheel. That is, the scroll part of the turbocharger allows exhaust gas discharged from the engine to flow only to a part of the plurality of scroll passages (for instance, the first scroll passage), and thereby it is possible to limit the range of the nozzle flow passage into which exhaust gas is introduced only to the part. Thus, in a case where exhaust gas is introduced into a part of the range of the nozzle flow passage by limiting to only a part of the plurality of scroll passages, it is possible to enhance the flow velocity and pressure of exhaust gas when passing through the turbine wheel compared to a case in which exhaust gas is introduced into the entire range of the nozzle flow passage, and thereby it is possible to drive the turbine more quickly. Further, by allowing exhaust gas to flow through only the radially inner side scroll passage of the first scroll passage, it is possible to increase the flow velocity and the pressure of exhaust gas and drive the turbine more quickly.

Further, with each of the plurality of scroll passages not overlapping with each other in the circumferential direction of the nozzle flow passage, it is possible to shift the highest point of the turbine efficiency in the U/C0 property toward the low U/C0 side, compared a twin scroll and a VFT turbine. That is, it is possible to improve the turbine efficiency at the low speed ratio side. Thus, in a case where the flow rate of exhaust gas is low, such as the low speed time of the engine (low speed ratio side), it is possible to rotary-drive the turbocharger more efficiently. Thus, by providing the scroll part having above features for the turbine, it is possible to drive the turbine more quickly and efficiently, and to improve the response of supercharging (supercharging effect).

(2) In some embodiments, in the above configuration (1), the flow-rate control valve is configured such that an entire amount of the exhaust gas flowing into the first scroll passage flows through the radially inner side scroll passage if the flow-rate control valve is in a fully-closed state, and that the exhaust gas flowing into the first scroll passage flows through both of the radially inner side scroll passage and the radially outer side scroll passage if the flow-rate control valve is in a valve-open state.

With the above configuration (2), it is possible to switch the flow passage of exhaust gas to only the radially inner side flow passage, or to both scroll passages, depending on the state of the flow-rate control valve. Accordingly, it is possible to adjust the rotation torque of the turbine.

(3) A two stage turbo system according to at least one embodiment of the present invention includes: a high-pressure stage turbocharger including a high-pressure stage turbine disposed in an exhaust passage of an engine; and a low-pressure stage turbocharger comprising the turbocharger according to the above (1) or (2), which includes a low-pressure stage turbine disposed on a downstream side of the high-pressure stage turbine in the exhaust passage and which is larger in size than the high-pressure stage turbocharger.

With the above configuration (3), the turbocharger according to the above (1) or (2) is used in the low-pressure stage turbocharger of the two-stage turbo system. Accordingly, it is possible to drive the large-sized low-pressure stage turbine of the two-stage turbo system more quickly and efficiently, and to improve the response of supercharging.

(4) In some embodiments, in the above configuration (3), the exhaust passage includes: a high-pressure stage introduction passage connecting the engine and an inlet of the high-pressure stage turbine; a first low-pressure stage introduction passage connecting an outlet side of the high-pressure stage turbine and the first scroll passage of the low-pressure stage turbine; and a second low-pressure stage introduction passage bypassing the high-pressure stage turbine and connecting the engine and the second scroll passage of the low-pressure stage turbine.

With the above configuration (4), the two-stage turbo system is capable of introducing exhaust gas having passed through the high-pressure stage turbine into the first scroll passage of the low-pressure stage turbine, and directly introducing exhaust gas into the second scroll passage of the low-pressure stage turbine without passing through the high-pressure stage turbine. Normally, the two-stage turbo system performs supercharging by using the high-pressure stage turbocharger to improve the supercharging response, if the rotation speed engine is in the middle rotation speed region or below. Like in this case, by introducing exhaust gas into the nozzle flow passage from the first scroll passage, it is possible to increase the flow rate or the like of exhaust gas after driving the high-pressure stage turbine when introducing the exhaust gas into the nozzle flow passage, and thereby it is possible to rotate the large-sized low-pressure stage turbine of the two-stage turbo system more quickly and efficiently. Further, when the flow velocity of exhaust gas is low, such as a case where the rotation speed of the engine is on the low rotation side (extremely-low rotation speed region) of the low rotation speed region, it is possible to improve the supercharging response even further by operating the flow-rate control valve and allowing the exhaust gas to flow into only the radially inner side scroll passage.

(5) In some embodiments, in the above configuration (4), the exhaust passage further includes: a high-pressure stage bypass passage bypassing the high-pressure stage turbine and connecting the engine and the first scroll passage of the low-pressure stage turbine, and a low-pressure stage bypass passage which bypasses the low-pressure stage turbine and which connects an upstream side and a downstream side of the low-pressure stage turbine. The two-stage turbo system further includes a valve device capable of adjusting proportion of a flow rate of the exhaust gas passing through each of the high-pressure stage introduction passage, the first low-pressure stage introduction passage, the radially inner side scroll passage, the radially outer side scroll passage, the second low-pressure stage introduction passage, the high-pressure stage bypass passage, and the low-pressure stage bypass passage.

With the above configuration (5), with the valve device, it is possible to adjust the proportion of the flow rate of exhaust gas that passes through each of the passages forming the exhaust passage (the high-pressure stage introduction passage, the first low-pressure stage introduction passage, the radially inner side scroll passage, the radially outer side scroll passage, the second low-pressure stage introduction passage, the high-pressure stage bypass passage, and the low-pressure stage bypass passage). Accordingly, it is possible to switch between the high-pressure stage turbocharger and the low-pressure stage turbocharger, or switch the scroll passage in the scroll part of the low-pressure stage turbine of the low-pressure stage turbocharger (the first scroll passage, the second scroll passage, the radially inner side scroll passage, the radially outer side scroll passage), and thereby it is possible to provide a two-stage turbo system having an improved supercharging response, whereby it is possible to generate a necessary boost pressure over a broad operational range of the engine.

(6) In some embodiments, in the above configuration (5), the valve device includes: the flow-rate control valve; a first valve disposed in the high-pressure stage introduction passage; a second valve disposed in the second low-pressure stage introduction passage; a third valve disposed in the high-pressure stage bypass passage; and a fourth valve disposed in the low-pressure stage bypass passage.

With the above configuration (6), it is possible to adjust the proportion of the flow rate of exhaust gas passing through each of the passages forming the exhaust passage. Further, with the fourth valve, it is possible to adjust the pressure (boost pressure) on the outlet side of the low-pressure stage compressor of the low-pressure stage turbocharger, and thereby it is possible to prevent abnormal operation of the low-pressure stage turbocharger, such as surging.

(7) In some embodiments, in the above configuration (5), the valve device includes: the flow-rate control valve; and a fifth valve capable of adjusting the flow rate of exhaust gas flowing through each of the high-pressure stage introduction passage, the second low-pressure stage introduction passage, the high-pressure stage bypass passage, and the low-pressure stage bypass passage.

With the above configuration (7), it is possible to adjust proportion of exhaust passage flowing through each flow passage forming the exhaust passage with two valves, and it is also possible to adjust the pressure (boost pressure) on the outlet side of the low-pressure stage compressor of the low-pressure stage turbocharger, thereby preventing abnormal operation of the low-pressure stage turbocharger, such as surging.

(8) In some embodiments, in any one of the above configurations (5) to (7), the two stage turbo system further includes a control device configured to control the valve device in accordance with a rotation speed of the engine.

With the above configuration (8), the control device controls the valve device, and thereby it is possible to adjust the proportion of the flow rate of exhaust gas passing through each of the passages forming the exhaust passage, and to realize an operation mode for the two-stage turbo system.

(9) In some embodiments, in the above configuration (8), the control device is configured to, if the rotation speed of the engine is in an extremely low rotation speed region, allow the exhaust gas to pass through each of the high-pressure stage introduction passage, the first low-pressure stage introduction passage, and the radially inner side scroll passage, and prevent the exhaust gas from passing through each of the radially outer side scroll passage, the second low-pressure stage introduction passage, the high-pressure stage bypass passage, and the low-pressure stage bypass passage.

With the above configuration (9), in a case where the rotation speed of the engine is in the extremely-low rotation speed region, exhaust gas flows into only the radially inner side scroll passage of the first scroll passage via the high-pressure stage turbine, and does not flow into the radially outer side scroll passage of the first scroll passage of the low-pressure stage turbine and the second scroll passage, and thereby it is possible to improve the response of the low-pressure stage turbocharger.

(10) In some embodiments, in any the above configuration (8) or (9), the control device is configured to, if the rotation speed of the engine is in a low rotation speed region, control the valve device so as to allow the exhaust gas to pass through each of the high-pressure stage introduction passage, the first low-pressure stage introduction passage, the radially inner side scroll passage, and the radially outer side scroll passage, and prevent the exhaust gas from passing through each of the second low-pressure stage introduction passage, the high-pressure stage bypass passage, and the low-pressure stage bypass passage.

With the above configuration (10), in a case where the rotation speed of the engine is in the low rotation speed region, exhaust gas does not flow into the second scroll passage of the low-pressure stage turbine, but exhaust gas flows into the entire first scroll passage including the radially inner side scroll passage and the radially outer side scroll passage, via the high-pressure stage turbine. Accordingly, in the low-pressure stage turbocharger, it is possible to improve the response of supercharging while ensuring an appropriate capacity corresponding to the flow rate of exhaust gas in the low rotation speed region.

(11) In some embodiments, in any one of the above configurations (8) to (10), the control device is configured to, if the rotation speed of the engine is in a middle rotation speed region, control the valve device so as to allow the exhaust gas to pass through each of the high-pressure stage introduction passage, the first low-pressure stage introduction passage, the radially inner side scroll passage, the radially outer side scroll passage, and the second low-pressure stage introduction passage, and prevent the exhaust gas from passing through each of the high-pressure stage bypass passage and the low-pressure stage bypass passage.

With the above configuration (11), in a case where the rotation speed of the engine is in the middle rotation speed region, exhaust gas flows into the entire first scroll passage of the low-pressure stage turbine, including the radially inner side scroll passage and the radially outer side scroll passage, via the high-pressure stage turbine, and exhaust gas flows into both of the first scroll passage and the second scroll passage. Accordingly, it is possible to improve the response of supercharging with the high-pressure stage turbocharger and the low-pressure stage turbocharger, while ensuring an appropriate capacity corresponding to the flow rate of exhaust gas in the middle rotation speed region.

(12) In some embodiments, in any one of the above configurations (8) to (11), the control device is configured to, if the rotation speed of the engine is in a high rotation speed region, control the valve device to allow the exhaust gas to pass through each of the high-pressure stage bypass passage, the first low-pressure stage introduction passage, the radially inner side scroll passage, the radially outer side scroll passage, and the second low-pressure stage introduction passage, and prevent the exhaust gas from passing through each of the high-pressure stage introduction passage and the low-pressure stage bypass passage.

With the above configuration (12), in a case where the rotation speed of the engine is in the high rotation speed region, exhaust gas does not flow into the high-pressure stage turbine, but exhaust gas flows into both of the entire first scroll passage of the low-pressure stage turbine, including the radially inner side scroll passage and the radially outer side scroll passage, and the second scroll passage. That is, turbocharging is performed by using only the low-pressure stage turbocharger having a high efficiency at the flow rate of exhaust gas in the high rotation speed region. Accordingly, appropriate turbocharging can be performed in accordance with a high flow rate of exhaust gas with the low-pressure stage turbocharger.

(13) In some embodiments, in the above configuration (12), the control device is configured to, if the rotation speed of the engine is not lower than a predetermined rotation speed within the high rotation speed region, control the valve device to allow the exhaust gas to pass through each of the high-pressure stage bypass passage, the first low-pressure stage introduction passage, the radially inner side scroll passage, the radially outer side scroll passage, the second low-pressure stage introduction passage, and the low-pressure stage bypass passage, and prevent the exhaust gas from passing through the high-pressure stage introduction passage.

With the above configuration (13), in a case where the rotation speed of the engine is at a high rotation speed side within the high rotation speed region, it is possible to adjust the boost pressure appropriately.

(14) A method of controlling a two stage turbo system according to at least one embodiment of the present invention is a method for controlling the two stage turbo system according to the above (8), which includes a high-pressure stage turbocharger including a high-pressure stage turbine disposed in an exhaust passage of an engine and a low-pressure stage turbocharger which includes a low-pressure stage turbine disposed downstream of the high-pressure stage turbine in the exhaust passage and which is larger in size than the high-pressure stage turbocharger, and the method includes: a rotation speed acquisition step of obtaining a rotation speed of the engine; a region determination step of determining a rotation speed region of the rotation speed of the engine; and a low rotation speed region control step of controlling, if the rotation speed of the engine is in an extremely-low rotation speed region or a low rotation speed region, the valve device so as to allow exhaust gas to pass through a first scroll passage of the low-pressure stage turbocharger via the high-pressure stage turbine, and prevent the exhaust gas from passing through a second scroll passage of the low-pressure stage turbocharger.

With the above configuration (14), similarly to the above (8), it is possible to realize an operation mode of the two-stage turbo system suitable for the rotation speed of the engine, while improving the supercharging response of the two-stage turbo system.

(15) In some embodiments, in the above configuration (14), the method further includes an extremely-low rotation speed time control step of controlling, if the rotation speed of the engine is in an extremely-low rotation speed region, the valve device so as to allow the exhaust gas to pass through a radially inner side scroll passage of the first scroll passage of the low-pressure stage turbocharger via the high-pressure stage turbine, and prevent the exhaust gas from passing through a radially outer side scroll passage of the first scroll passage of the low-pressure stage turbocharger.

With the above configuration (15), similarly to the above (9), it is possible to improve the response of the low-pressure stage turbocharger in the extremely-low rotation speed region.

(16) In some embodiments, in the above configuration (14) or (15), the method further includes a low rotation speed time control step of controlling, if the rotation speed of the engine is in the low rotation speed region, the valve device so as to allow the exhaust gas to pass through both of the radially inner side scroll passage and the radially outer side scroll passage of the first scroll passage of the low-pressure stage turbocharger via the high-pressure stage turbine, and prevent the exhaust gas from passing through the second scroll passage. With the above configuration (16), similarly to the above (10), in the low-pressure stage turbocharger, it is possible to improve the response of supercharging while ensuring an appropriate capacity corresponding to the flow rate of exhaust gas in a case where the rotation speed of the engine is in the low rotation speed region.

(17) In some embodiments, in any one of the above configurations (14) to (16), the method further includes the middle rotation speed time control step of controlling, if the rotation speed of the engine is in a middle rotation speed region, the valve device so as to allow the exhaust gas to pass through both of the radially inner side scroll passage and the radially outer side scroll passage of the first scroll passage of the low-pressure stage turbocharger via the high-pressure stage turbine, and prevent the exhaust gas from passing through the second scroll passage.

With the above configuration (17), it is possible to improve the response of supercharging with the high-pressure stage turbocharger and the low-pressure stage turbocharger, while ensuring an appropriate capacity corresponding to the flow rate of exhaust gas in a case where the rotation speed of the engine is in the middle rotation speed region.

Advantageous Effects

According to at least one embodiment of the present invention, provided is a turbocharger with an improved supercharging response, whereby it is possible to generate a necessary boost pressure over a broad operational range of an engine, and a two-stage turbo system including the turbocharger.

BRIEF DESCRIPTION OF DRAWINGS

FIG. 8 is a flowchart of a method for controlling the two-stage turbo system according to an embodiment of the present invention.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
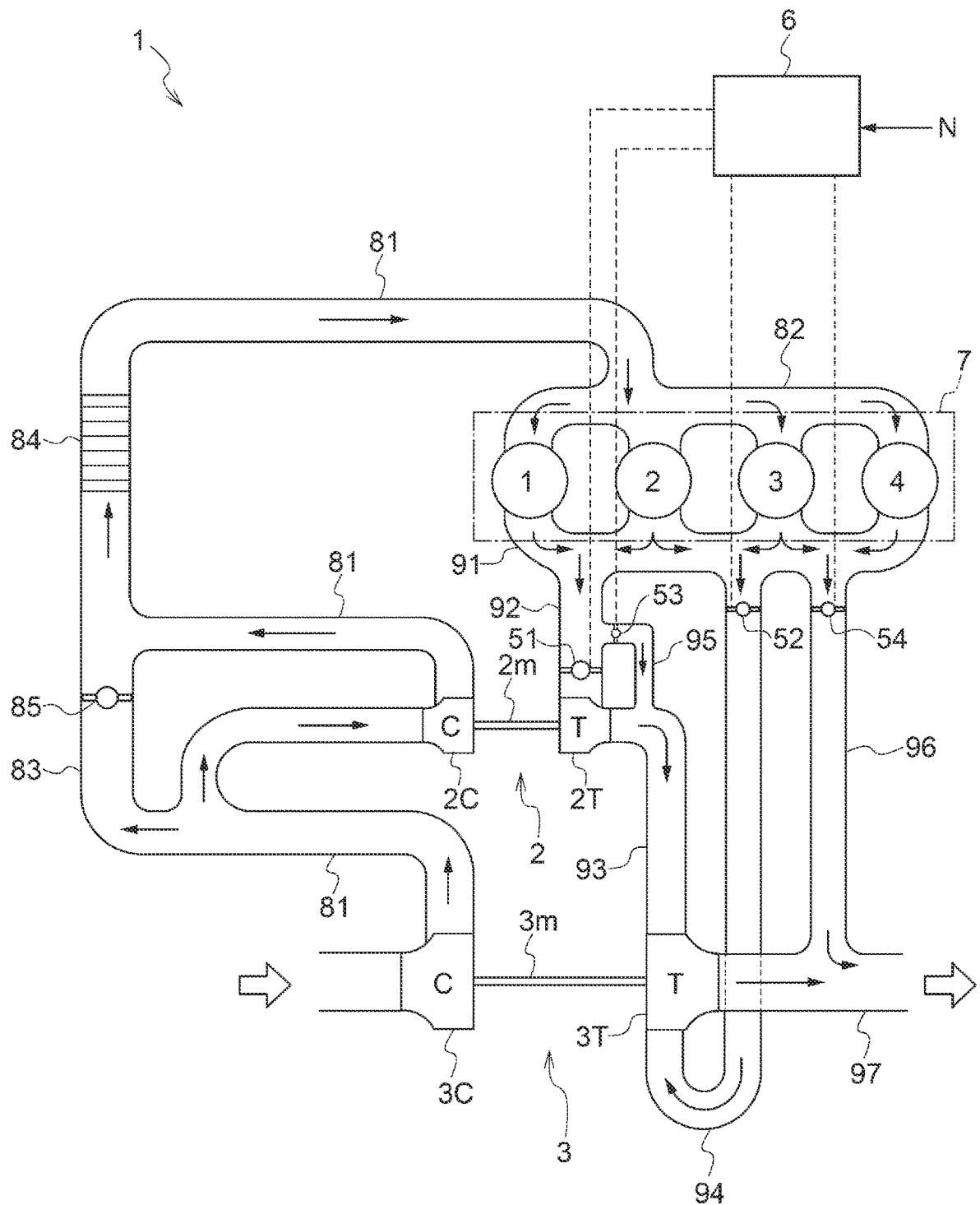
FIG. 1 is a schematic diagram showing a two-stage turbo system applied to an engine according to an embodiment of the present invention.
Figure 2:
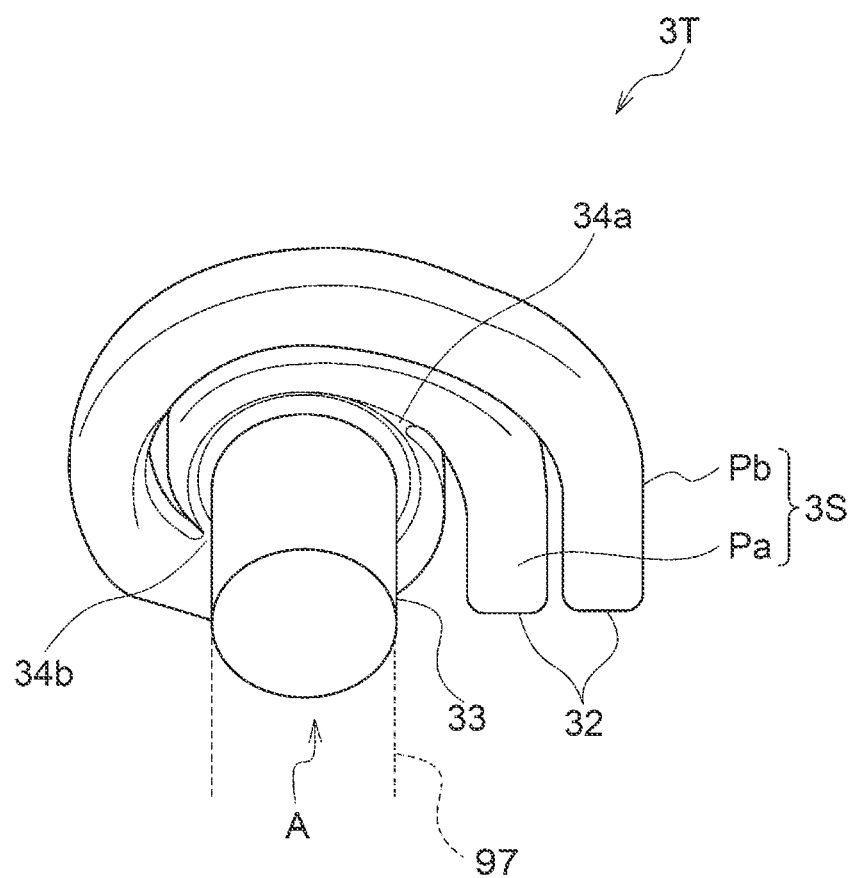
FIG. 2 is a schematic diagram of a scroll part of a low-pressure stage turbine of a low-pressure stage turbocharger according to an embodiment of the present invention. The scroll part has a double scroll structure including two scroll passages.
Figure 3:
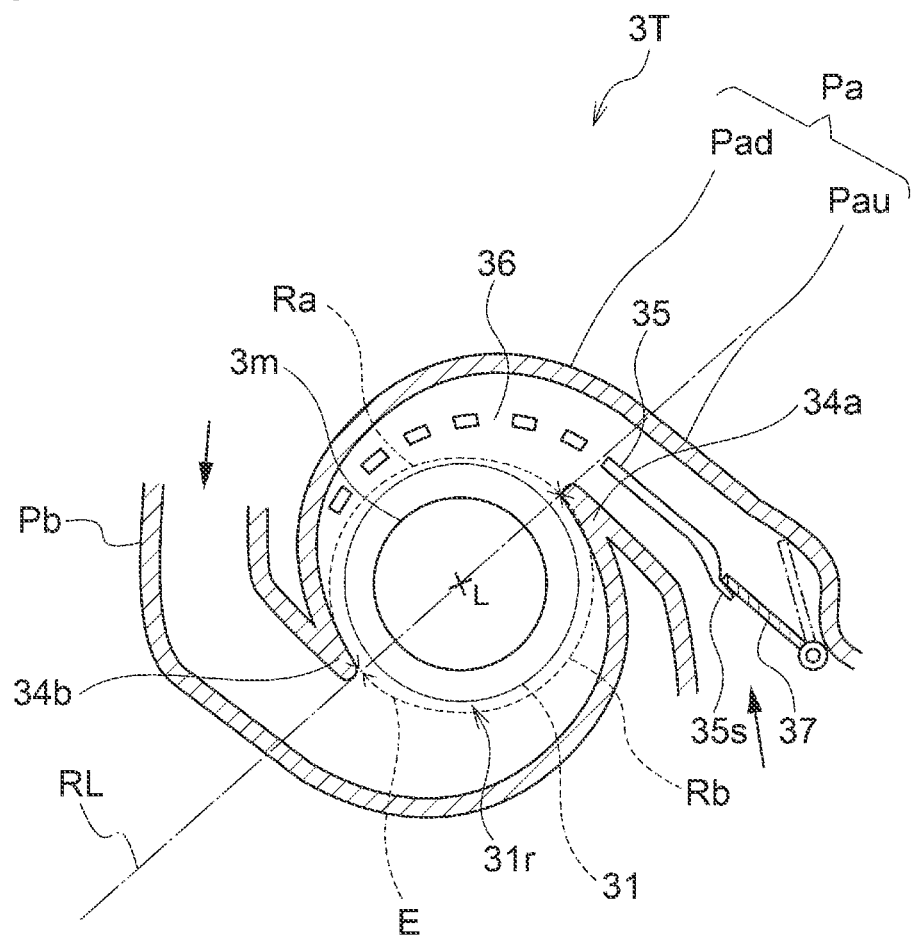
FIG. 3 is a cross-sectional view of a scroll part of a low-pressure stage turbine of a low-pressure stage turbocharger according to an embodiment of the present invention, taken along the circumferential direction, which is a view of a part of the scroll part shown in FIG. 2 as seen in the direction A.
Figure 4:
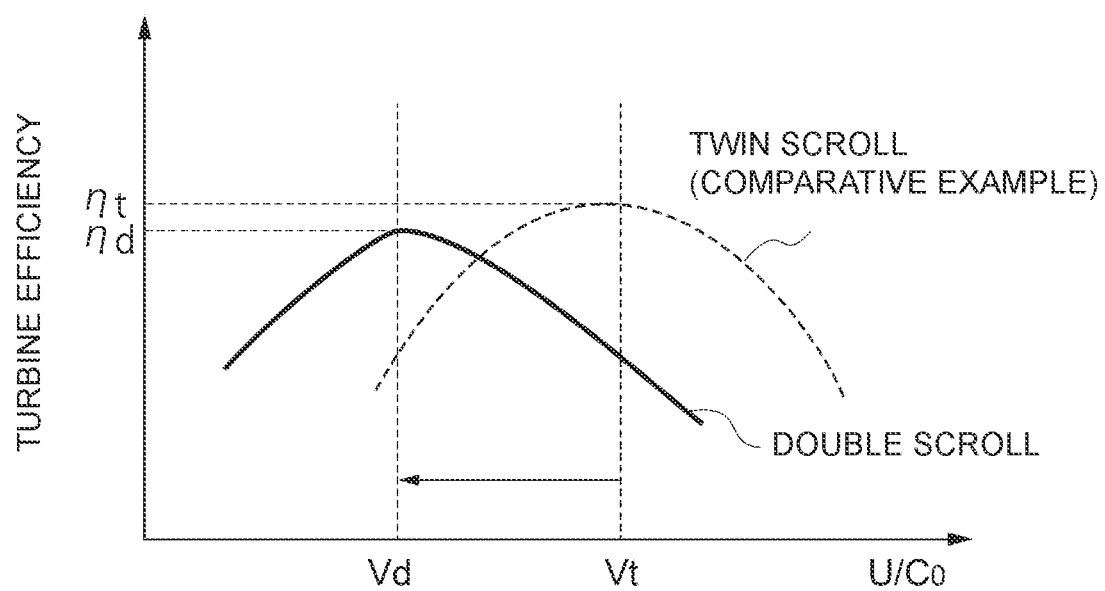
FIG. 4 is a diagram for describing the U/C0 property of the low-pressure stage turbocharger including a scroll part having a double scroll structure according to an embodiment of the present invention.
Figure 5A:
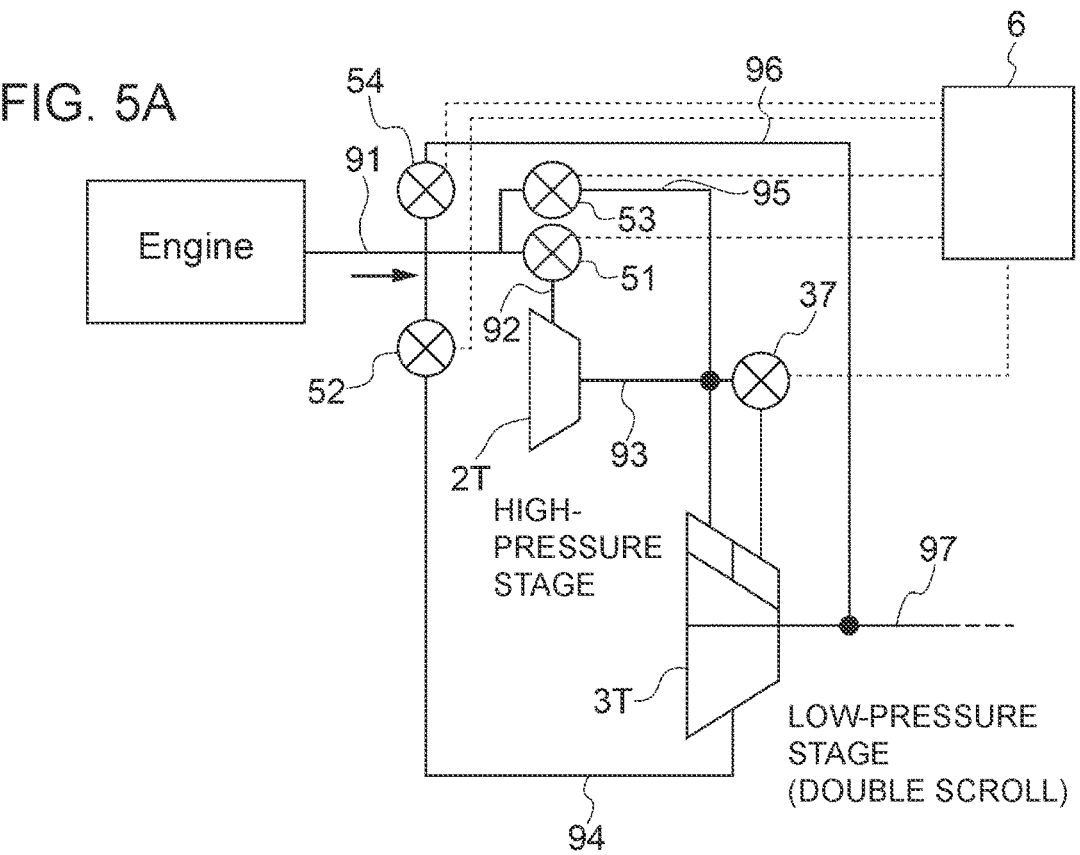
FIG. 5A is a simplified schematic diagram showing the exhaust passage side of the two-stage turbo system according to an embodiment of the present invention, where the valve device includes five valves.
Figure 5B:
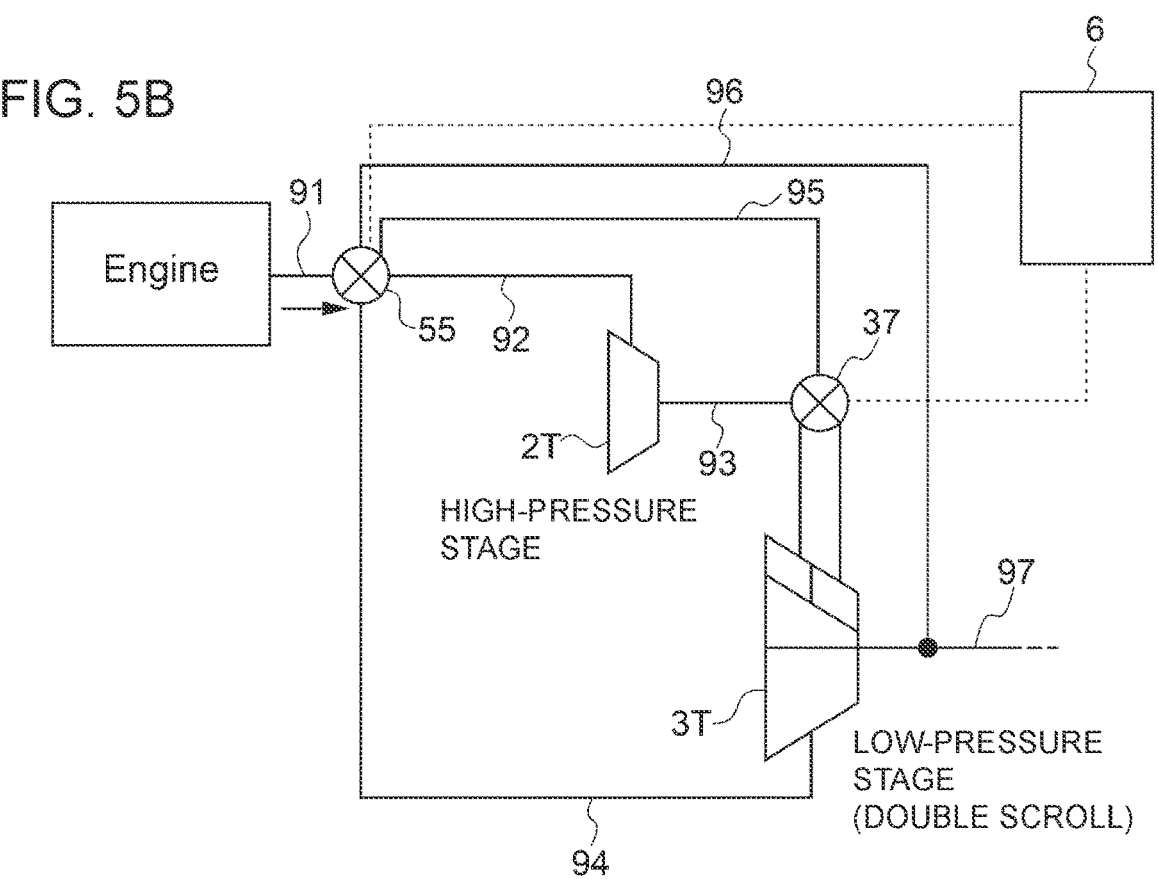
FIG. 5B is a simplified schematic diagram showing the exhaust passage side of the two-stage turbo system according to an embodiment of the present invention, where the valve device includes two valves.

FIG. 1 is a schematic diagram showing a two-stage turbo system 1 applied to an engine 7 according to an embodiment of the present invention. FIG. 2 is a schematic diagram of a scroll part 3S of a low-pressure stage turbine 3T of a low-pressure stage turbocharger 3 according to an embodiment of the present invention. The scroll part 3S has a double scroll structure including two scroll passages P. FIG. 3 is a cross-sectional view of a scroll part 3S of a low-pressure stage turbine 3T of a low-pressure stage turbocharger 3 according to an embodiment of the present invention, taken along the circumferential direction, which is a view of a part of the scroll part 3S shown in FIG. 2 as seen in the direction A. FIG. 4 is a diagram for describing the U/C0 property of the low-pressure stage turbocharger including a scroll part 3S having a double scroll structure according to an embodiment of the present invention. FIGS. 5A and 5B are each a simplified schematic diagram showing the side of an exhaust passage 9 of the two-stage turbo system 1 according to an embodiment of the present invention. FIGS. 6B to 6E are each a schematic diagram for describing the operation mode of the two-stage turbo system 1 corresponding to FIG. 5A. Further, FIGS. 7B to 7E are each a schematic diagram for describing the operation mode of the two-stage turbo system 1 corresponding to FIG. 5B.

As shown in FIGS. 1 to 7E, the two-stage turbo system 1 is a supercharging system to be applied to the engine 7. The engine 7 is, for instance, a diesel engine or a gasoline engine including one or more cylinders (four cylinders in FIG. 1). Furthermore, the two-stage turbo system 1 can be also applied to an engine 7 of various fields, such as automobile, truck, bus, ship, industrial engine, etc.

In the embodiment described below, the turbocharger according to an embodiment of the present invention is applied to the low-pressure stage turbocharger 3 in the two-stage turbo system 1.

As shown in FIGS. 1 to 7E, the two-stage turbo system 1 includes two turbochargers: a high-pressure stage turbocharger 2 and a low-pressure stage turbocharger 3. Each of the turbochargers (the high-pressure stage turbocharger 2 and the low-pressure stage turbocharger 3) includes a compressor C (2C, 3C) disposed in an intake passage 8 of the engine 7 and a turbine T (2T, 3T) disposed in an exhaust passage 9 of the engine 7. The turbine T includes a turbine housing and a turbine wheel (reference numeral 31 in FIG. 3), and the compressor C includes a compressor housing and a compressor wheel. Further, the compressor wheel of the compressor C and the turbine wheel 31 of the turbine T are coupled via a shaft m (2m, 3m). Further, exhaust gas discharged from the combustion chamber (not shown) of the engine 7 rotary-drives the turbine wheel when flowing through the exhaust passage 9 toward the outside. Accordingly, the compressor wheel coupled coaxially to the turbine wheel 31 via the shaft m is rotary driven, and intake air flowing through the intake passage 8 is compressed. More specifically, exhaust gas after passing through the scroll part S of the turbocharger blows into the turbine wheel from a nozzle flow passage E, and thereby the turbine T is rotary driven (see FIG. 3).

The above high-pressure stage turbocharger 2 and the low-pressure stage turbocharger 3 are connected in series in the two-stage turbo system 1. Specifically, as shown in FIGS. 1, 5A to 7E, in the exhaust passage 9, the turbine T of the high-pressure stage turbocharger 2 (high-pressure stage turbine 2T) is disposed on the upstream side in the exhaust passage 9, which is a side relatively close to the engine 7 with respect to the flow direction of the exhaust gas, and the turbine T of the low-pressure stage turbocharger 3 (low-pressure stage turbine 3T) is disposed on the downstream side in the exhaust passage 9, which is a side relatively far from the engine 7 with respect to the flow direction of exhaust gas compared to the high-pressure stage turbine 2T. Furthermore, in the intake passage 8, the compressor C of the low-pressure stage turbocharger 3 (low-pressure stage compressor 3C) is disposed on the upstream side in the intake passage 8, and the compressor C of the high-pressure stage compressor 2 (high-pressure stage compressor 2C) is disposed in the intake passage 8 on the downstream side of the low-pressure stage compressor 3C (see FIG. 1). As described above, the above two superchargers are disposed in series in the intake passage 8 and the exhaust passage 9.

Further, the low-pressure stage turbocharger 3 is larger in size than the high-pressure stage turbocharger 2. Normally, a larger turbocharger has more weight, and a weight increase causes the inertia to increase. Thus, with a size increase of the turbocharger, the rotation speed of the turbine T becomes less likely to increase at the low speed time of the engine 7, and the response performance deteriorates. On the other hand, a larger turbocharger has a better turbine efficiency in a region where the exhaust gas flow rate is high, compared to a smaller turbocharger. Contrary, a smaller turbocharger has a better turbine efficiency in a region where the flow rate of exhaust gas is low, compared to a larger supercharger, and thus the turbine T can be rotary driven efficiently with a low flow rate of exhaust gas. By utilizing the above characteristics of turbochargers, the two-stage turbo system 1 is configured to cover the flow rate range of the low flow rate side with the relatively small high-pressure stage turbocharger 2, and to cover the flow rate range of the high flow rate side with the relatively large low-pressure stage turbocharger 3.

Further, as described below, the two-stage turbo system 1 controls the valve device 5 disposed in the exhaust passage 9 with the control device 6, for instance, to switch the flow passage of the exhaust passage 9 (exhaust passages I to V described below) in accordance with the operation conditions of the engine 7, thereby switching the operation mode (turbocharger to be used) in the single stage supercharging and the two-stage supercharging. Accordingly, the response at a low speed time of the engine 7 is improved, while generating a necessary boost pressure over a broad operational range of the engine 7. Further, the above single stage supercharging refers to an operation mode in which the engine 7 is supercharged by using the low-pressure stage turbocharger 3 alone, and the two-stage supercharging refers to an operation mode in which supercharging is performed by using both of the high-pressure stage turbocharger 2 and the low-pressure stage turbocharger 3.

Herein, the scroll part 3S of the low-pressure stage turbine 3T of the turbocharger (low-pressure stage turbocharger 3) according to an embodiment of the present invention will be described with reference to FIGS. 2 and 3. Further, the scroll part 3S forms a part of the turbine housing. As shown in FIGS. 2 and 3, the scroll part 3S of the low-pressure stage turbine 3T of the present embodiment includes at least two scroll passages P: the first scroll passage Pa, and the second scroll passage Pb. Further, as shown in FIG. 3, the first range Ra of the nozzle flow passage E into which exhaust gas flowing through the first scroll passage Pa is introduced does not overlap with the second range Rb of the nozzle flow passage E into which exhaust gas flowing through the second scroll passage Pb is introduced, in the circumferential direction of the nozzle flow passage E. The above nozzle flow passage E is a space (flow passage) positioned at a boundary connecting a wheel housing chamber 31r that houses the turbine wheel 31 and the scroll part 3S, and is formed by the inner wall of the turbine housing, around the turbine wheel 31 of the low-pressure stage turbine 3T (see FIG. 3). In the embodiment shown in FIGS. 1 to 7E, as shown in FIG. 3, exhaust gas having entered from the inlet 32 (see FIG. 2) of the scroll part S (low-pressure stage turbine 3T) and passed through the first scroll passage Pa blows into the turbine wheel 31 via the first range Ra of the nozzle flow passage E, while exhaust gas having passed through the second scroll passage Pa blows into the turbine wheel 31 via the second range Rb of the nozzle flow passage E. Further, after blowing into the turbine wheel 31 from the nozzle flow passage E, exhaust gas flows through a low-pressure stage downstream passage 97 from an outlet 33 of the low-pressure stage turbine 3T disposed along the axial direction of the rotational axis L of the shaft m.

Further, in the embodiment shown in FIGS. 1 to 7E, as shown in FIGS. 2 and 3, the scroll part 3S of the low-pressure stage turbine 3T has a double scroll structure including the first scroll passage Pa and the second scroll passage Pb described above. More specifically, in the double scroll structure, the first scroll passage Pa and the second scroll passage Pb are disposed next to each other along the circumferential direction.

Furthermore, in the embodiment shown in FIGS. 1 to 7E, as shown in FIG. 3, the nozzle flow passage E is formed into an annular shape over the entire outer perimeter of the turbine wheel 31 shown in a circular shape. Herein, the turbine housing includes two tongues 34 formed thereon, including a tongue on the side connected to the passage wall of the radially inner side of the first scroll passage Pa (first tongue 34a) and a tongue on the side connected to the passage wall of the radially outer side of the first scroll passage Pa (second tongue 34b). In other words, the first tongue 34a is the tongue on the side connected to the passage wall on the radially outer side of the second scroll passage Pa, and the second tongue 34b is the tongue on the side connected to the passage wall on the inner side of the second scroll passage Pa. Further, in the cross section (see FIG. 3) taken along the circumferential direction of the rotational axis L of the turbine wheel 31, where a boundary line RL is a line passing through the first tongue 34a, the second tongue 34b, and the rotational axis L of the turbine wheel 31, the first range Ra of the nozzle flow passage E is formed on a side (semi-perimeter portion) of the boundary line RL, and the second range Rb of the nozzle flow passage E is formed on the opposite side (semi-perimeter portion) of the boundary line RL. As described above, the scroll part 3S is formed such that the first range Ra and the second range Rb do not have a range (portion) overlapping with each other. In other words, the passage walls of the first scroll passage Pa and the second scroll passage Pb are connected to different portions of the turbine housing forming the nozzle flow passage E (see FIG. 2).

Further, as described below, in a case where the entire flow rate of exhaust gas discharged from the engine 7 is introduced into only one of the two scroll passages P, the first scroll passage Pa or the second scroll passage Pb, the size of the nozzle flow passage E upon introduction of the entire amount of the flow rate of exhaust gas would be smaller than that in a case where exhaust gas is introduced into the two scroll passages P (Pa, Pb) separately. In the embodiment shown in FIGS. 1 to 7E, the first range Ra and the second range Rb have the same angular range (same size). The range of the nozzle flow passage E into which exhaust gas can be introduced from one of the scroll passages is about a half of the entire perimeter of the nozzle flow passage E. Thus, exhaust gas can be introduced into the low-pressure stage turbine 3T without dispersing (attenuating) the pressure of exhaust gas over the entire range of the nozzle flow passage E upon introduction of exhaust gas into the nozzle flow passage E, and thus it is possible to drive the low-pressure stage turbine 3T more quickly at the low speed time of the engine 7.

In contrast, for instance, also in a case where a twin scroll is applied to the scroll part 3S of the low-pressure stage turbine 3T, two passages are formed in the scroll part 3S by the twin scroll, but each of the two passages of the twin scroll are configured to introduce exhaust gas uniformly over the entire perimeter of the turbine wheel 31. That is, the two passages of the twin scroll introduce exhaust gas into the same range of the nozzle flow passage E, and thus the ranges of the nozzle flow passage E in communication with the respective two scroll passages have an overlapping portion in the circumferential direction of the nozzle flow passage E. Further, when the entire flow rate of exhaust gas is introduced into one of the two scroll passages, the exhaust gas is introduced over the entire perimeter of the turbine wheel 31. Thus, for instance, if the size (weight) of the turbine T is large relative to the flow rate of exhaust gas, as a result of the pressure of exhaust gas being dispersed over the entire range of the nozzle flow passage E, particularly at an operational point where the flow rate of exhaust gas is low such as the low speed time of the engine 7, a sufficient pressure ratio (differential pressure between the pressure surface and the suction surface at each blade) cannot be obtained, and it is difficult to rotary-drive the large-sized low-pressure stage turbine 3T quickly.

Furthermore, with the scroll part 3S of the low-pressure stage turbine 3T having the above described double scroll structure, as shown in FIG. 4, for the U/C0 property, which is a turbine efficiency with respect to the speed ratio (U/C0) of the circumferential speed of the turbine T and the theoretical speed, it is possible to shift the highest point of the turbine efficiency of the low-pressure stage turbine 3T toward the low speed ratio side than that in a case where a twin scroll is provided. The U/C0 property represents the relationship between the turbine efficiency and the turbine operation speed ratio (U/C0), which is a speed ratio of the circumferential speed (U) of the turbine T to the theoretical speed (C0), and is shown in a chart where x-axis is the turbine operation speed ratio (U/C0) and y-axis is the turbine efficiency. Herein, the circumferential speed (U) of the turbine T is the rotation speed obtained from the number of rotation of the turbine T, and the theoretical speed (C0) of the turbine T is a speed defined from a pressure ratio of the inlet and the outlet of the turbine and the inlet temperature. Further, when the highest point of the turbine efficiency of the U/C0 property shifts toward the low speed ratio side, it means that the efficiency is high at the low speed time of the engine, such as the start of rotation of the turbine T where the circumferential speed (U) of the turbine T is low relative to the theoretical speed (C0). Thus, in a case where the flow rate of exhaust gas is low, such as the low speed time of the engine 7, it is possible to rotate the low-pressure stage turbine 3T efficiently.

In the example shown in FIG. 4, the U/C0 property is shown for two turbochargers which are different form each other only in the structure of the scroll part, which is a twin scroll structure or a double scroll structure. Specifically, the turbine operation speed ratio at the highest point (ηt) of the turbine efficiency of the turbocharger including the twin scroll is Vt, and the turbine operation speed ratio of the highest point (ηd) of the turbine efficiency of the turbocharger including the double scroll structure is Vd. Further, both turbochargers each have a U/C0 property having a convex shape protruding from x-axis across the speed ratio corresponding to the highest point (ηt, ηd). Further, while ηd is smaller than ηt and the turbine efficiency is lower, Vd is smaller than Vt, and the U-C0 property of the turbocharger with the double structure having a convex shape is overall shifted toward the low speed ratio side compared to the U/C0 property of the turbocharger with the twin scroll having a convex shape. Thus, when comparing the U/C0 properties of the two turbochargers at the same speed ratio on the low speed ratio side, at the speed ratio Vd for instance, the turbocharger with the double scroll structure has a higher turbine efficiency than the turbocharger with the twin scroll, and thus has a high efficiency at the low-speed side of the engine 7.

Furthermore, as shown in FIG. 3, in the turbocharger (low-pressure stage turbocharger 3) according to an embodiment of the present invention, the first scroll passage Pa connected to the first low-pressure stage introduction passage 93 includes a division wall 35 along the flow direction of exhaust gas in a predetermined range of the first scroll passage Pa, and a flow-rate control valve 37 disposed upstream of the division wall 35. The division wall 35 divides the first scroll passage Pa into the radially outer side scroll passage Po and the radially inner side scroll passage Pi positioned on the radially inner side of the radially outer side scroll passage Po, and includes a communication hole 36 which brings the radially outer side scroll passage Po and the radially inner side scroll passage Pi into communication. The flow-rate control valve 37 is a valve disposed on the upstream side of the division wall 35, for adjusting the flow rate of exhaust gas flowing through the radially outer side scroll passage Po and the radially inner side scroll passage Pi.

For the sake of convenience, of the radially inner side scroll passage Pi, a portion closer to the nozzle flow passage E of the first scroll passage Pa than a line connecting the center of the shaft m and the tip of the above described first tongue section 34*a* (i.e. Boundary line RL of FIG. 3), which faces the first range Ra of the nozzle flow passage E, is referred to as a downstream portion Pad, and a portion upstream of the downstream portion Pad is referred to as an upstream portion Pau. In this case, the flow-rate control valve 37 is positioned in the upstream portion Pau. Further, in the embodiment shown in FIGS. 1 to 7E, as shown in FIG. 3, the division wall 35 is formed over the downstream portion Pad and the upstream portion Pau, and the tip portion 35*s* on the upstream side of the division wall 35 is disposed downstream of the flow-rate control valve 37. Further, a portion of the division wall 35 positioned at the upstream portion Pau includes a plurality of communication holes 36 formed thereon.

Further, in the embodiment shown in FIGS. 1 to 7E, as shown in FIG. 3, the flow-rate control valve 37 is configured to allow the entire amount of exhaust gas flowing into the first scroll passage Pa to flow through the radially inner side scroll passage Pi if the flow-rate control valve 37 is in the fully-closed state, and allow exhaust gas flowing into the first scroll passage Pa to flow through both of the radially inner side scroll passage Pi and the radially outer side scroll passage Po if the flow-rate control valve 37 is in the valve-open state. More specifically, the flow-rate control valve 37 has a length that reaches from the rotational shaft 370 of the flow-rate control valve 37 disposed on the wall surface side of the outer perimeter of the first scroll passage Pa to the tip portion 35*s* of the upstream side of the division wall 35. Further, with the tip portion 35*s* on the upstream side of the division wall 35 being a valve seat, when the flow-rate control valve 37 rotates about the rotational shaft 37*o* and thereby the flow-rate control valve 37 is in the fully-closed state where the tip portion of the flow-rate control valve 37 is seated on the valve seat, the entire amount of exhaust gas flowing into the first scroll passage Pa flows through the radially inner side scroll passage Pi. In the fully-closed state, the flow-passage area of the first scroll passage Pa through which exhaust gas flows becomes smaller corresponding to the flow passage area of the radially outer side scroll passage Po. Thus, with exhaust gas passing through the radially inner side scroll passage Pi, it is possible to increase the flow velocity of exhaust gas, and to increase the rotation torque of the turbine T. Further, when the flow-rate control valve 37 is in the valve-open state which is a state other than the fully-closed state, exhaust gas flowing into the first scroll passage Pa flows through both of the radially inner side scroll passage Pi and the radially outer side scroll passage Po. In the valve-open state, exhaust gas having flown through the radially outer side scroll passage Po flows through the upstream portion Pau of the first scroll passage Pa along the division wall 35, and then is introduced into the first range of the nozzle flow passage E from the communication hole 36 formed on the downstream portion Pad via the radially inner side scroll passage Pi. Further, it is possible to reduce the flow velocity of gas compared to a case where the flow-rate control valve 37 is in the valve-closed state, and thus it is possible to avoid an unnecessary increase in the rotation torque of the turbine T.

In the above described embodiment, the division wall 35 and the flow-rate control valve 37 are disposed in the first scroll passage Pa. Nevertheless, the division wall 35 and the flow-rate control valve 37 may be also disposed in the second scroll passage Pb similarly. Further, in the above described embodiment, the scroll part 3S having a double scroll structure and including the division wall 35 and the flow-rate control valve 37 is applied to the low-pressure stage turbine 3T. Nevertheless, this embodiment is not limitative, and in some other embodiments, the scroll part 3S according to the embodiment may be applied to the high-pressure stage turbine 2T, or to a scroll part of a turbocharger, whether or not it is a part of the two-stage turbo system 1.

With the above configuration, the scroll part 3S of the low-pressure stage turbine 3T of low-pressure stage turbocharger 3 (turbocharger 3) includes, at least, the first scroll passage Pa and the second scroll passage Pb. Further, the first scroll passage Pa is divided (formed) into the radially outer side scroll passage Po and the radially inner side scroll passage Pi, and the flow rate of the two passages is adjustable. Herein, each of the first scroll passage Pa and the second scroll passage Pb is configured to introduce exhaust gas partially from different directions into the nozzle flow passage E formed around the turbine wheel 31. That is, the scroll part 3S of the low-pressure stage turbine 3T allows exhaust gas discharged from the engine 7 only to a part of the plurality of scroll passages P (in FIGS. 1 to 4, the first scroll passage Pa), and thereby it is possible to limit the range of the nozzle flow passage E into which exhaust gas is introduced only to the part. Thus, in a case where exhaust gas is introduced into a part of the range of the nozzle flow passage E by limiting to only a part of the plurality of scroll passages P, it is possible to enhance the flow velocity and pressure of exhaust gas when passing through the turbine wheel 31 compared to a case in which exhaust gas is introduced into the entire range of the nozzle flow passage E, and thereby it is possible to drive the low-pressure stage turbine 3T more quickly. Further, the low-pressure stage turbine 3T is configured to be capable of allowing exhaust gas flowing into the first scroll passage Pa only to the radially inner side scroll passage Pi. By allowing exhaust gas to flow through only the radially inner side scroll passage Pi, it is possible to increase the flow velocity and the pressure of exhaust gas and drive the low-pressure stage turbine 3T more quickly.

Further, with each of the plurality of scroll passages P not overlapping with each other in the circumferential direction of the nozzle flow passage E, it is possible to shift the highest point of the turbine efficiency in the U/C0 property to the low speed ratio side, compared to a case in which the ranges of the nozzle flow passage E corresponding to the respective scroll passages P are overlapped in the circumferential direction, like the twin scroll. That is, it is possible to improve the turbine efficiency at the low speed ratio side. Thus, in a case where the flow rate of exhaust gas is low, such as the low speed time of the engine 7 (low speed ratio side), it is possible to rotary-drive the low-pressure stage turbine 3T more efficiently. Therefore, by providing the scroll part 3S having above features for the low-pressure stage turbine 3T, it is possible to drive the large-sized low-pressure stage turbine 3T of the two-stage turbo system 1 more quickly and efficiently, and to improve the response of supercharging. In this regard, although the response performance of a typical low-pressure stage turbocharger is low at the low speed time of the engine, as described above, and thus the high-pressure stage turbocharger mainly covers the boost pressure required at the low speed time of the engine, it is possible to increase the contribution from the low-pressure stage turbocharger 3 in the present embodiment, and the response is improved.

In the embodiment shown in FIGS. 1 to 7E, the entire perimeter of the nozzle flow passage E is divided equally into the first range Ra and the second range Rb not overlapping with each other across the boundary line RL. However, this embodiment is not limitative. The entire range formed by the first range Ra and the second range Rb does not need to be the entire perimeter of the nozzle flow passage E. In other words, in a partial range of the nozzle flow passage E having an annular shape, exhaust gas may not necessarily be introduced directly after passing through the scroll passage P. Further, in the embodiment shown in FIGS. 1 to 7E, the angular range of the first range Ra and the angular range of the second range Rb are the same. Nevertheless, in some embodiments, the angular range of the first range Ra and the angular range of the second range Rb may be different. It is possible to improve the rotation torque of the turbine wheel with exhaust gas in accordance with the angular range of the first range Ra to which the first low-pressure stage introduction passage 93 is connected. Further, in the embodiment shown in FIGS. 1 to 7E, the scroll part 3S of the low-pressure stage turbine 3T has the double scroll structure as described above. Nevertheless, in another embodiment, the scroll part 3S of the low-pressure stage turbine 3T may include two or more scroll passages P. In this case, the scroll part 3S is formed such that the ranges of the nozzle flow passage E corresponding to the respective passages of the at least two scroll passages P (the first scroll passage Pa and the second scroll passage Pb) do not overlap.

Next, the overall configuration of the engine 7 including the two-stage turbo system 1 will be described with reference to FIGS. 1, 5A to 7E. While the intake passage 8 of the engine 7 is not shown in FIGS. 5A to 7E, the intake passage 8 shown in FIG. 1 is connected to the engine 7.

In the embodiment shown in FIGS. 1 to 7E, as shown in FIG. 1, two types of flow passages are disposed in the intake passage 8 of the engine 7. Specifically, the intake passage 8 of the engine 7 includes a main intake passage 81 for supplying intake air (air) taken in from an intake duct (not shown) to the engine 7, an intake manifold 82 for distributing intake air from the main intake passage 81 to each of the plurality of cylinders of the engine 7, and a high-pressure stage compressor bypass passage 83. Furthermore, a compressor bypass valve 85 is disposed in the high-pressure stage compressor bypass passage 83. Further, as the control device 6 (described below) or the like controls the opening degree of the compressor bypass valve 85, the flow passage along the intake passage 8 for the intake air to pass through is determined.

In the configuration of the intake passage 8 having the above described configuration, the first flow passage includes the main intake passage 81 and the intake manifold 82. In the main intake passage 81, disposed in this order from the upstream side are the low-pressure stage compressor 3C of the low-pressure stage turbocharger 3, the high-pressure stage compressor 2C of the high-pressure stage turbocharger 2, and the inter cooler 84 for increasing the intake density by cooling. Further, the intake air passes through the main intake passage 81 in this order and then passes through the intake manifold 82, thereby being supplied to the engine 7 from the intake duct without passing through the high-pressure stage compressor bypass passage 83.

The second flow passage includes the main intake passage 81, the high-pressure stage compressor bypass passage 83, and the intake manifold 82. The intake air can pass through the second flow passage only when the compressor bypass valve 85 is open. The first and second ends of the high-pressure stage compressor bypass passage 83 are connected to the vicinity of the outlet (downstream side) of the low-pressure stage compressor 3C in the main intake passage 81 and the vicinity of the inlet (upstream side) of the inter cooler 84, respectively. Further, the intake air passes through the low-pressure stage compressor 3C of the low-pressure stage turbocharger 3, the high-pressure stage compressor bypass passage 83, the inter cooler 84, and the intake manifold 82 in this order, thereby being supplied to the engine 7 from the intake duct. As described below, the two-stage turbo system 1 is configured to perform the first stage turbocharging with only the low-pressure stage turbocharger 3 at the high speed time of the engine 7, and by opening the compressor bypass valve 85, it is possible to prevent deterioration of pressure loss due to passage through the high-pressure stage compressor 2C of the high-pressure stage turbocharger 2.

Further, in the exhaust passage 9 of the engine 7, as shown in FIGS. 1, 5A to 7E, five types of flow passage are provided, which are different from one another, as to whether the exhaust gas passes through the high-pressure stage turbine 2T and the low-pressure stage turbine 3T disposed in the exhaust passage 9, and how the exhaust gas passes through the low-pressure stage turbine 3T. Furthermore, the exhaust passage 9 of the engine 7 includes an exhaust manifold 91 which collects exhaust gas (combustion gas) discharged from the respective cylinders of the engine 7. Further, a common feature of the five types of flow passage is that each flow passage is connected to the engine 7 via the above described exhaust manifold 91. Each of the five types of flow passage will be described (see FIGS. 5A to 7E).

The first flow passage (exhaust gas flow passage I) is a flow passage for supplying exhaust gas discharged from the engine 7 to the radially inner side scroll passage Pi of the first scroll passage Pa of the low-pressure stage turbine 3T (hereinafter, also referred to as the radially inner side scroll passage Pi of the low-pressure stage turbine 3T), via the high-pressure stage turbine 21'. In the embodiment shown in FIGS. 1 to 7E, the exhaust passage 9 includes a high-pressure stage introduction passage 92 connecting the engine 7 and the inlet (scroll part 2S) of the high-pressure stage turbine 2T, and a first low-pressure stage introduction passage 93 connecting the outlet side of the high-pressure stage turbine 2T and the first scroll passage Pa of the low-pressure stage turbine 3T. Further, the exhaust gas flow passage I is formed such that exhaust gas discharged from the engine 7 is supplied to the radially inner side scroll passage Pi of the first scroll passage Pa after passing through the high-pressure stage introduction passage 92 and the first low-pressure stage introduction passage 93 in sequence.

The second flow passage (exhaust gas flow passage II) is a flow passage for supplying exhaust gas discharged from the engine 7 to the radially outer side scroll passage Po of the first scroll passage Pa of the low-pressure stage turbine 3T (hereinafter, also referred to as the radially outer side scroll passage Po of the low-pressure stage turbine 3T), via the high-pressure stage turbine 2T. In the embodiment shown in FIGS. 1 to 7E, the exhaust passage 9 includes the high-pressure stage introduction passage 92 and the first low-pressure stage introduction passage 93, as described above. Further, the exhaust gas flow passage II is formed such that exhaust gas discharged from the engine 7 is supplied to the radially outer side scroll passage Po of the second scroll passage Pb after passing through the high-pressure stage introduction passage 92 and the first low-pressure stage introduction passage 93 in sequence.

The third flow passage (exhaust gas flow passage III) is a flow passage for supplying exhaust gas discharged from the engine 7 to the second scroll passage Pb of the low-pressure stage turbine 3T, while bypassing the high-pressure stage turbine 2T. In the embodiment shown in FIGS. 1 to 7E, the exhaust passage 9 includes a second low-pressure stage introduction passage 94 connecting the engine 7 and the second scroll passage Pb of the low-pressure stage turbine 3T, while bypassing the high-pressure stage turbine 2T. That is, the above exhaust gas flow passage III is formed such that exhaust gas discharged from the engine 7 passes through the second low-pressure stage introduction passage 94, thereby being directly supplied to the second scroll passage Pb of the low-pressure stage turbine 3T while bypassing the high-pressure stage turbine 2T.

With the above configuration, the two-stage turbo system 1 is capable of introducing exhaust gas having passed through the high-pressure stage turbine 2T into the first scroll passage Pa of the low-pressure stage turbine 3T, and directly introducing exhaust gas into the second scroll passage Pb of the low-pressure stage turbine 3T without passing through the high-pressure stage turbine 2T. As described below, the two-stage turbo system 1 performs turbocharging by using the high-pressure stage turbocharger 2 to improve the supercharging response, if the rotation speed of the engine 7 is in the middle rotation speed region or below. Like in this case, by introducing exhaust gas into the nozzle flow passage E from the first scroll passage Pa, it is possible to increase the flow rate or the like of exhaust gas after driving the high-pressure stage turbine 2T when introducing the exhaust gas into the nozzle flow passage E, and thereby it is possible to rotate the large-sized low-pressure stage turbine 3T of the two-stage turbo system 1 more quickly and efficiently. Further, when the flow rate of exhaust gas is low, such as a case where the rotation speed of the engine 7 is on the low rotation side (extremely-low rotation speed region) of the low rotation speed region, it is possible to improve the supercharging response even further by operating the flow-rate control valve 37 and allowing the exhaust gas to flow into only the radially inner side scroll passage Pi.

Further, the fourth flow passage (exhaust gas flow passage IV) is a flow passage for supplying exhaust gas discharged from the engine 7 to at least one of the radially inner side scroll passage Pi or the radially outer side scroll passage Po of the low-pressure stage turbine 3T (in FIGS. 1 to 7E, both), without passing through the high-pressure stage turbine 2T. In the embodiment shown in FIGS. 1 to 7E, the exhaust passage 9 includes a high-pressure stage bypass passage 95 connecting the engine 7 and the first scroll passage Pa of the low-pressure stage turbine 3T, while bypassing the high-pressure stage turbine 2T. The high-pressure stage bypass passage 95 connects the high-pressure stage introduction passage 92 and the first low-pressure stage introduction passage 93, thereby connecting the engine 7 and the first scroll passage Pa of the low-pressure stage turbine 3T while bypassing the high-pressure stage turbine 2T. Further, in some other embodiments, the exhaust manifold 91 and the first low-pressure stage introduction passage 93 may be connected by the high-pressure stage bypass passage 95. Further, the above exhaust gas flow passage IV is formed such that exhaust gas discharged from the engine 7 passes through the high-pressure stage bypass passage 95, thereby being directly supplied to the first scroll passage Pa of the low-pressure stage turbine 3T while bypassing the high-pressure stage turbine 2T.

The fifth flow passage (exhaust gas flow passage V) is a flow passage for supplying exhaust gas discharged from the engine 7 to the exhaust passage 9 downstream of the low-pressure stage turbine 3T, without passing either one of the high-pressure stage turbine 2T or the low-pressure stage turbine 3T. In the embodiment shown in FIGS. 1 to 7E, the exhaust passage 9 includes a low-pressure stage bypass passage 96 connecting the upstream side and the downstream side of the low-pressure stage turbine 3T, bypassing the low-pressure stage turbine 3T. Further, the low-pressure stage bypass passage 96 connects the exhaust manifold 91 to the low-pressure stage downstream passage 97 connected to the outlet of the low-pressure stage turbine 3T. Accordingly, it is possible to reduce the flow rate of exhaust gas flowing through the first scroll passage Pa and the second scroll passage Pb of the low-pressure stage turbine 3T, simultaneously. Further, in some embodiments, the second low-pressure stage introduction passage 94 may be connected to the low-pressure stage downstream passage 97.

Furthermore, in the exhaust passage 9 of the engine 7, as shown in FIGS. 1, 5A to 7E, a valve device 5 capable of adjusting the flow rate of exhaust gas flowing through the above described five types of flow passage is disposed. In the embodiment shown in FIGS. 1 to 7E, the valve device 5 is configured to be capable of adjusting proportion of the flow rate of exhaust gas that flows through each of the high-pressure stage introduction passage 92, the first low-pressure stage introduction passage 93, the radially inner side scroll passage Pi, the radially outer side scroll passage Po, the second low-pressure stage introduction passage 94, the high-pressure stage bypass passage 95, and the low-pressure stage bypass passage 96 described above. Accordingly, it is possible to switch between the high-pressure stage turbocharger 2 and the low-pressure stage turbocharger 3, or switch the scroll passage P in the scroll part 3S of the low-pressure stage turbine 3T of the low-pressure stage turbocharger 3, and thereby it is possible to provide a two-stage turbo system 1 having an improved supercharging response, whereby it is possible to generate a necessary boost pressure over a broad operational range of the engine 7.

Furthermore, the configuration of the valve device 5 will be described. In the embodiment shown in FIGS. 5A, 6A to 6E, the valve device 5 includes the above described flow-rate control valve 37, a first valve 51 disposed in the high-pressure stage introduction passage 92, the flow-rate control valve 37 disposed in the first scroll passage Pa, a second valve 52 disposed in the second low-pressure stage introduction passage 94, a third valve 53 disposed in the high-pressure stage bypass passage 95, and a fourth valve 54 disposed in the low-pressure stage bypass passage 96. At least one of the above valves (37, 51 to 54) may by a valve whose opening degree can be adjusted (linear-controlled) continuously between a fully-open position and a fully-closed position, and the remaining valves may be switchable between a fully-open state and a fully-open position alternatively. For instance, with at least the first valve 51 or the second valve 52 being linearly controllable, it is possible to adjust the flow rate ratio of exhaust gas flowing through the first scroll passage Pa and the second scroll passage Pb of the low-pressure stage turbine 3T. Accordingly, as described below, it is possible to adjust the proportion of the flow rate of exhaust gas passing through each of the high-pressure stage introduction passage 92, the first low-pressure stage introduction passage 93, the radially inner side scroll passage Pi, the radially outer side scroll passage Po, the second low-pressure stage introduction passage 94, the high-pressure stage bypass passage 95, and the low-pressure stage bypass passage 96, with the plurality of valves (37, 51 to 54) disposed in the respective passages. Further, with the fourth valve 54, it is possible to adjust the pressure (boost pressure) on the outlet side of the low-pressure stage compressor 3C of the low-pressure stage turbocharger 3, and thereby it is possible to prevent abnormal operation of the low-pressure stage turbocharger 3, such as surging.

In some other embodiments, as shown in FIGS. 5B, 7B to 7E, the valve device 5 includes the flow-rate control valve 37, and a fifth valve 55 capable of adjusting the flow rate of exhaust gas that flows through each of the high-pressure stage introduction passage 92, the second low-pressure stage introduction passage 94, the high-pressure stage bypass passage 95, and the low-pressure stage bypass passage 96. Accordingly, it is possible to adjust proportion of exhaust passage flowing through each passage forming the exhaust passage 9 with two valves, and it is also possible to adjust the pressure (boost pressure) on the outlet side of the low-pressure stage compressor 3C of the low-pressure stage turbocharger 3, thereby preventing abnormal operation of the low-pressure stage turbocharger 3, such as surging.

Further, in some embodiments, as shown in FIGS. 1, 5A to 7E, the two-stage turbo system 1 further includes a control device 6 for controlling the above described valve device 5 in accordance with the rotation speed of the engine 7 (hereinafter, also referred to as the engine rotation speed N). The control device 6 includes a computer such as an electronic control device (ECU), which includes a CPU (processor, not depicted) and a memory (storage device) such as ROM and RAM. The CPU operates (e.g. computation of data) in accordance with program instructions loaded to a main storage device, and thereby functional parts required to control the valve device 5 are implemented. Accordingly, it is possible to adjust the proportion of the flow rate of exhaust gas flowing through each of the first low-pressure stage introduction passage 93, the radially inner side scroll passage Pi, the radially outer side scroll passage Po, the second low-pressure stage introduction passage 94, the high-pressure stage bypass passage 95, and the low-pressure stage bypass passage 96, appropriately in accordance with the rotation speed of the engine 7, and to realize an operation mode for the two-stage turbo system 1 as described below.

Hereinafter, the operation mode of the two-stage turbo system 1 will be described with reference to FIGS. 6B to 7E. In the two-stage turbo system 1, the operation mode is switched depending on the rotation speed of the engine 7, which is one of the following, listed in the ascending order according to the engine rotation speed N: extremely-low rotation speed region, low rotation speed region, middle speed rotation region, and high rotation speed region. Herein, the extremely-low rotation speed region is a region where the engine rotation speed is not higher than a first threshold (N≤1), the low rotation speed region is a region where the engine rotation speed N is from the first threshold to the second threshold which is greater than the first threshold (first threshold<N≤second threshold), the middle rotation speed region is a region where the engine rotation speed N is from the second threshold to the third threshold which is greater than the second threshold (second threshold<N≤third threshold), and the high rotation speed region is a region where the engine rotation speed is greater than the third threshold (third threshold<N). In the two-stage turbo system 1, if the engine rotation speed is in extremely-low rotation speed region and the low rotation speed region, turbocharging is performed with two turbochargers: the high-pressure stage turbocharger 2 and the low-pressure stage turbocharger 3 (two stage turbocharging). If the rotation speed of the engine 7 is in the middle rotation speed region, depending on an increase in the rotation speed of the engine 7, the valve device 5 is controlled to perform flow-passage switch and flow-rate adjustment for exhaust gas, and proportion of turbocharging by the high-pressure stage turbocharger 2 is gradually reduced. Further, if the engine rotation speed is in the high rotation speed region, turbocharging is performed with only the low-pressure stage turbocharger 3 (single stage turbocharging). As described above, the two-stage turbo system 1 has an operation principle in which the two-stage turbocharging and the single-stage turbocharging are switched to perform turbocharging in accordance with the rotation speed of the engine 7.

The above operation principle is realized by the control device 6 controlling the valve device 5 in accordance with the rotation speed region of the engine 7. Thus, in the embodiment shown in FIGS. 1 to 7E, an output of a rotation-speed sensor (not shown) capable of detecting the rotation speed of the engine 7 is input into the control device 6, and the rotation speed of the engine (hereinafter, also referred to as the engine rotation speed N) is input. In some other embodiments, an output of a flow-rate sensor (not shown) capable of detecting the flow rate of exhaust gas discharged from the engine 7 may be input to the control device 6, and the rotation speed of the engine 7 (hereinafter, also referred to as the engine rotation speed) may be obtained from a corresponding relationship between the engine rotation speed N and the detection value of the flow-rate sensor (not shown). Further, the operation mode of the two-stage turbo system 1 in the embodiment shown in FIGS. 1 to 7E is as follows.

Figure 6A:
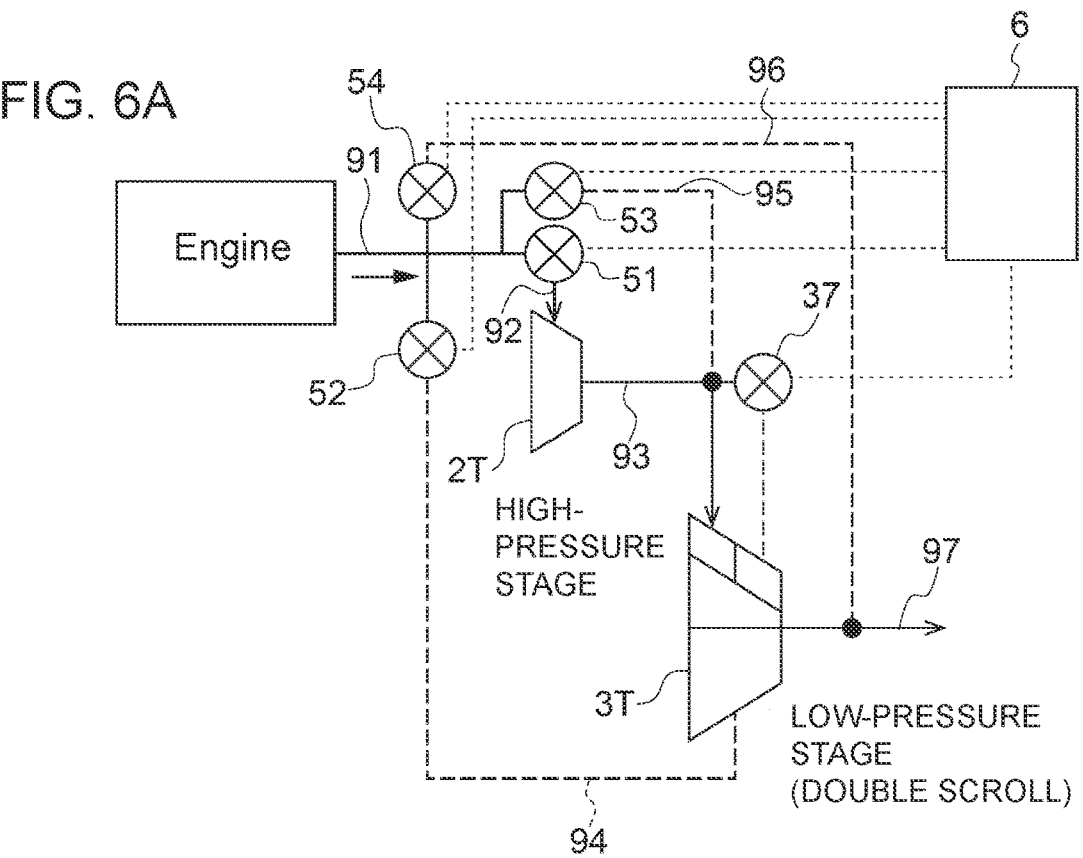
FIG. 6A is a schematic diagram for describing the operation mode of the two-stage turbo system corresponding to FIG. 5A, showing the operation mode in a case where the rotation speed of the engine is in an extremely-low rotation speed region.
Figure 6B:
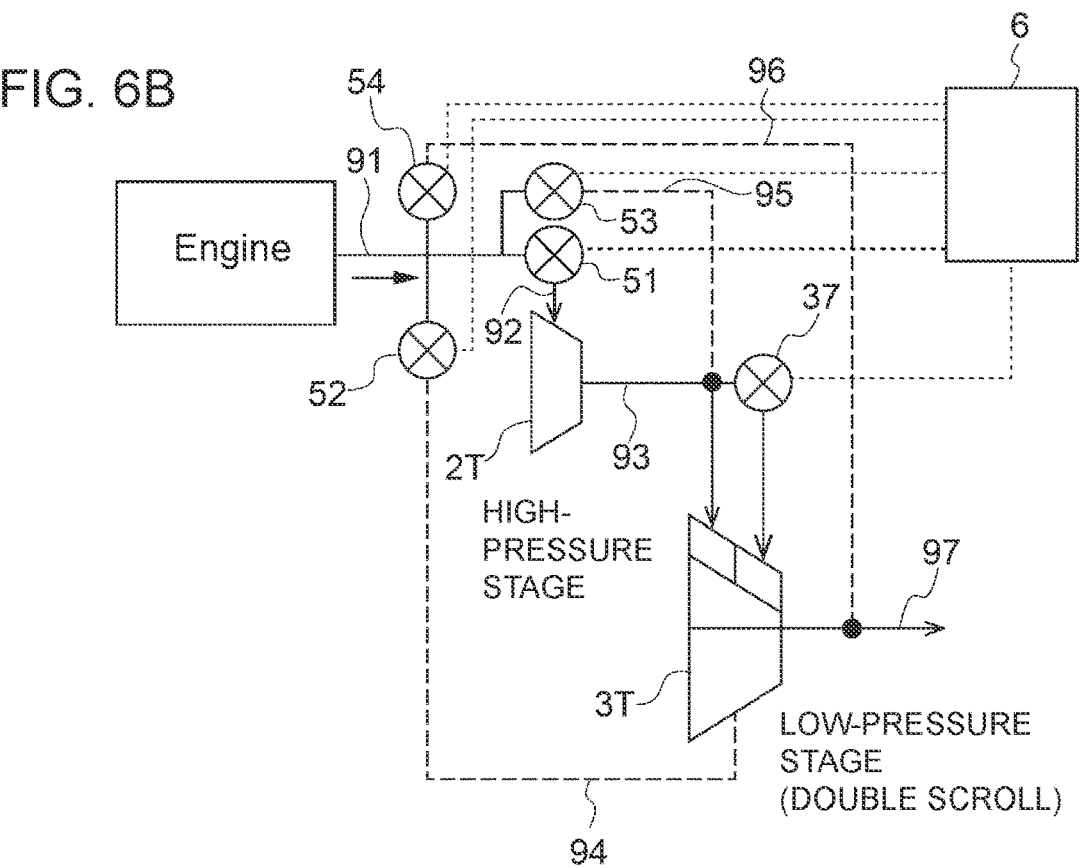
FIG. 6B is a schematic diagram for describing the operation mode of the two-stage turbo system corresponding to FIG. 5A, showing the operation mode in a case where the rotation speed of the engine is in a low rotation speed region.
Figure 6C:
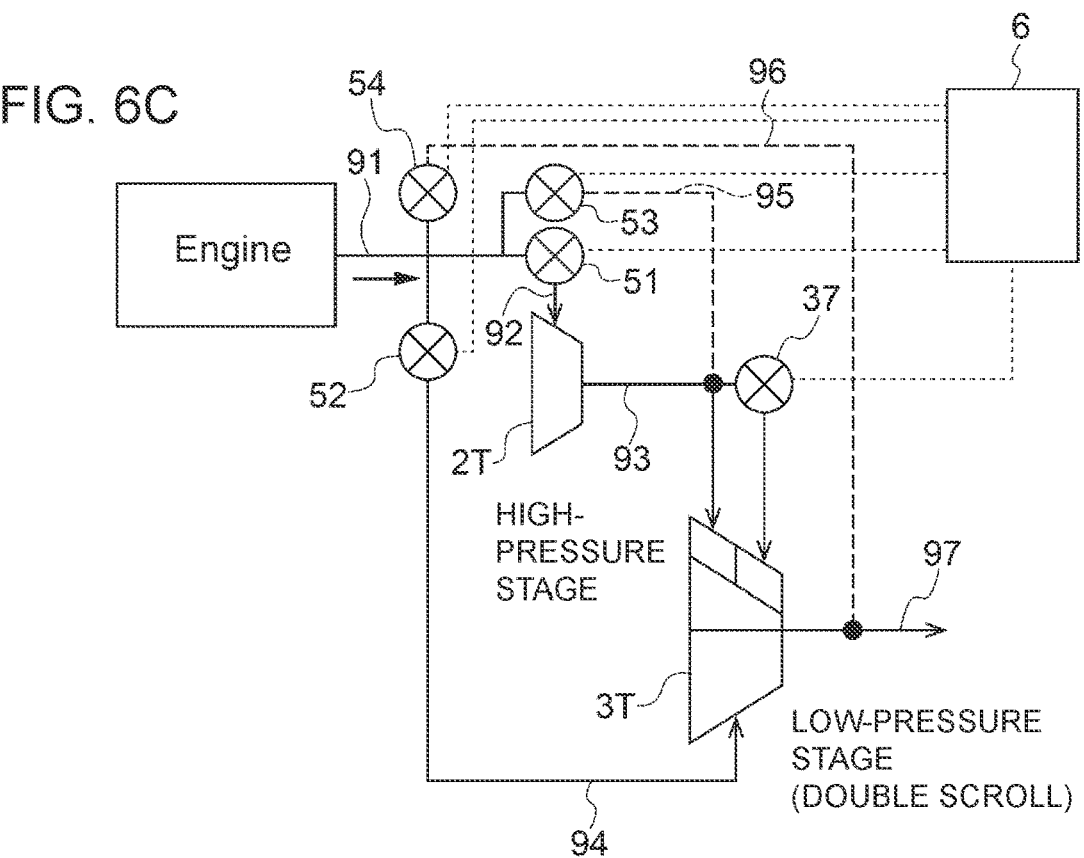
FIG. 6C is a schematic diagram for describing the operation mode of the two-stage turbo system corresponding to FIG. 5A, showing the operation mode in a case where the rotation speed of the engine is in a middle rotation speed region.
Figure 6D:
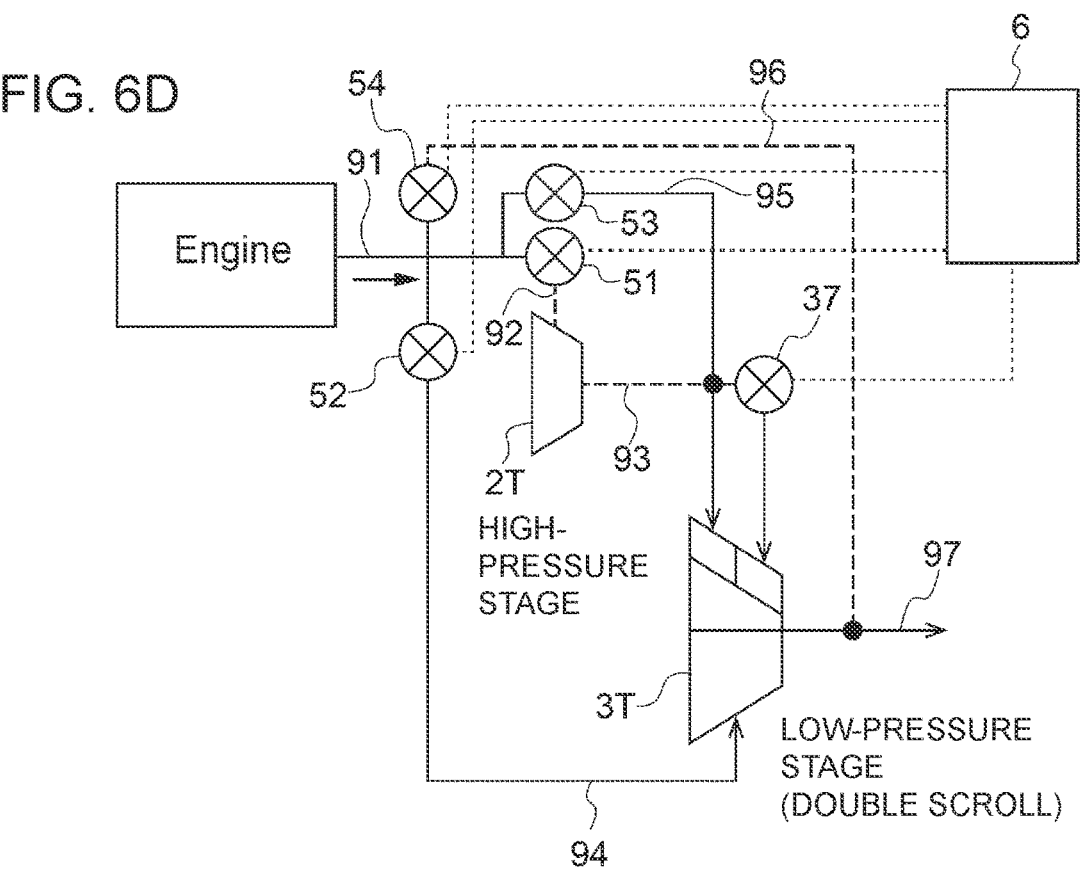
FIG. 6D is a schematic diagram for describing the operation mode of the two-stage turbo system corresponding to FIG. 5A, showing the operation mode in a case where the rotation speed of the engine is in a high rotation speed region.
Figure 6E:
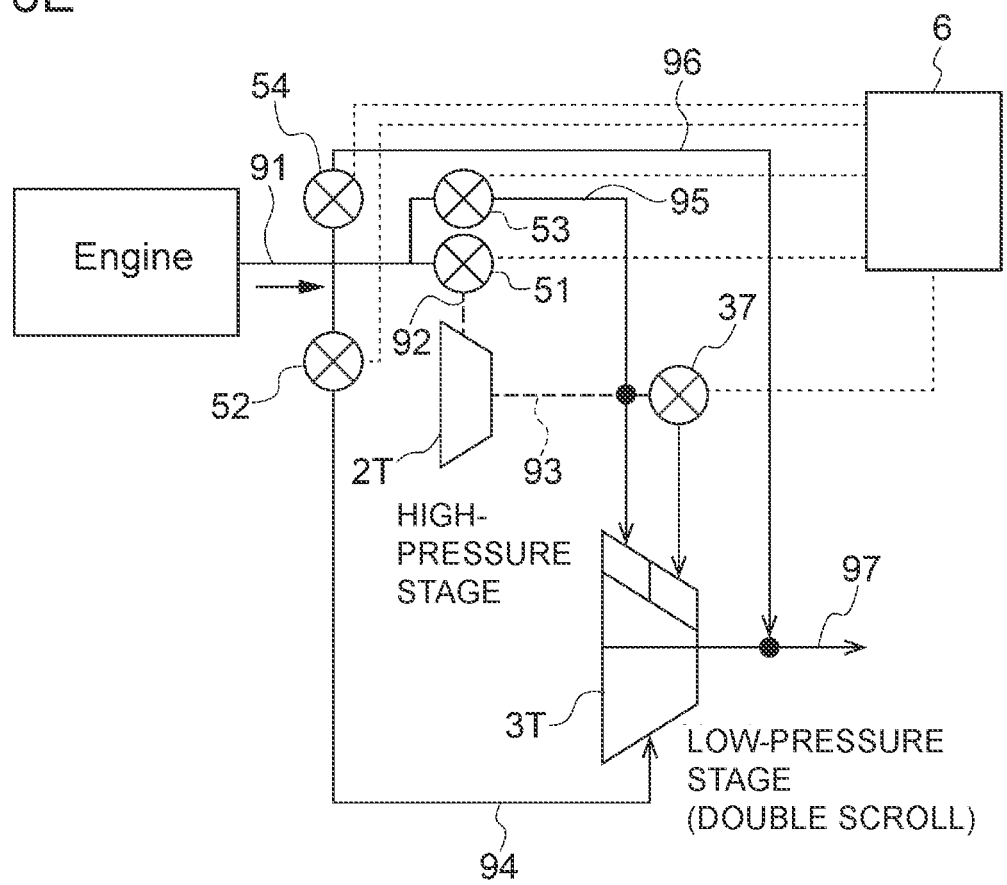
FIG. 6E is a schematic diagram for describing the operation mode of the two-stage turbo system corresponding to FIG. 5A, showing the operation mode in a case where the rotation speed of the engine is at a high rotation speed side within the high rotation speed region.
Figure 7A:
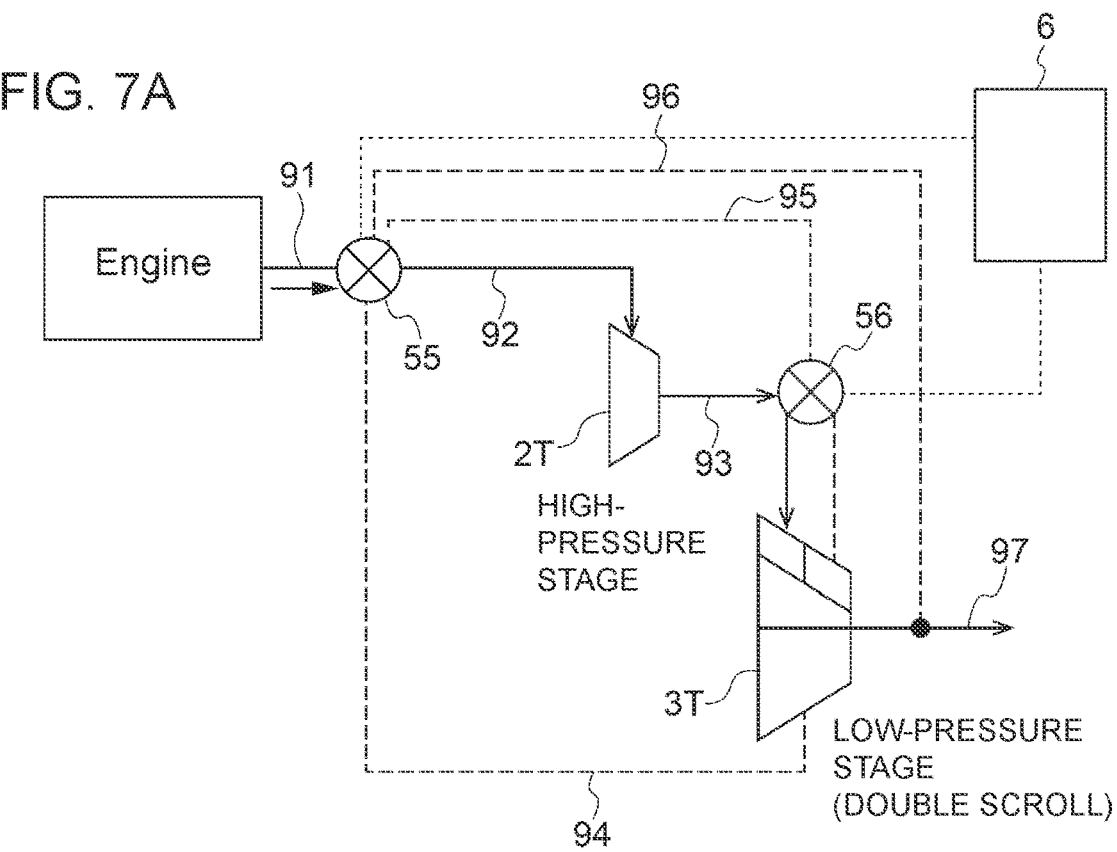
FIG. 7A is a schematic diagram for describing the operation mode of the two-stage turbo system corresponding to FIG. 5B, showing the operation mode in a case where the rotation speed of the engine is in an extremely-low rotation speed region.

FIGS. 6A and 7A are each a diagram showing the first operation mode M in a case where the engine rotation speed N is in the extremely-low rotation speed region. In this case, as shown in FIGS. 6A and 7A, the control device 6 controls the valve device 5 so as to allow exhaust gas to flow through only the flow passage (above described exhaust gas flow passage I) for supplying exhaust gas discharged from the engine 7 to the radially inner side scroll passage Pi of the first scroll passage Pa of the low-pressure stage turbine 3T, via the high-pressure stage turbine 2T. That is, in the embodiment shown in FIGS. 1 to 7E, as shown in FIGS. 6A and 7A, when the rotation speed of the engine 7 is in the extremely-low rotation speed region, the control device 6 controls the valve device 5 so as to allow the exhaust gas to pass through each of the high-pressure stage introduction passage 92, the first low-pressure stage introduction passage 93 and the radially inner side scroll passage Pi, and prevent the exhaust gas from passing each of the radially outer side scroll passage Po, the second low-pressure stage introduction passage 94, the high-pressure stage bypass passage 95, and the low-pressure stage bypass passage 96. Thus, the exhaust gas is supplied only to the radially inner side scroll passage Pi of the first scroll passage Pa, and is not supplied to the radially outer side scroll passage Po of the first scroll passage Pa and the second scroll passage Pb of the low-pressure stage turbocharger 3. Accordingly, it is possible to improve the response of supercharging while ensuring an appropriate capacity corresponding to the flow rate of exhaust gas in a case where the rotation speed of the engine 7 is in the extremely-low rotation speed region.

Figure 7B:
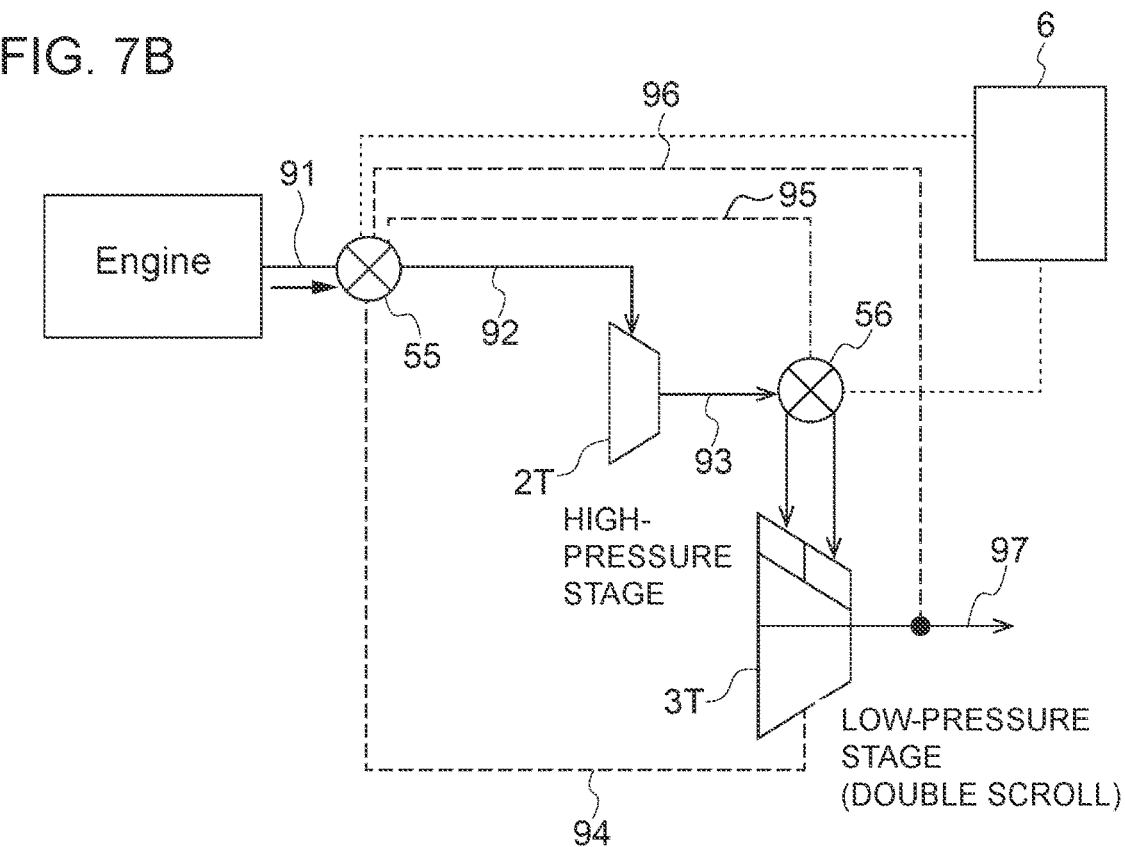
FIG. 7B is a schematic diagram for describing the operation mode of the two-stage turbo system corresponding to FIG. 5B, showing the operation mode in a case where the rotation speed of the engine is in a low rotation speed region.

FIGS. 6B and 7B are each a diagram showing the second operation mode M2 in a case where the engine rotation speed N is in the low rotation speed region. In this case, as shown in FIGS. 6B and 7B, the control device 6 controls the valve device 5 so as to allow exhaust gas to flow through two flow passages: the flow passage (above described exhaust gas flow passage I) for supplying exhaust gas discharged from the engine 7 to the radially inner side scroll passage Pi the first scroll passage Pa of the low-pressure stage turbine 3T, via the high-pressure stage turbine 2T; and the flow passage (above described exhaust gas flow passage II) for supplying exhaust gas discharged from the engine 7 to the radially outer side scroll passage Po of the low-pressure stage turbine 3T via the high-pressure stage turbine 2T. That is, in the embodiment shown in FIGS. 1 to 7E, as shown in FIGS. 6B and 7B, when the rotation speed of the engine 7 is in the low rotation speed region, the control device 6 controls the valve device 5 so as to allow the exhaust gas to pass through each of the high-pressure stage introduction passage 92, the first low-pressure stage introduction passage 93, the radially inner side scroll passage Pi, and the radially outer side scroll passage Po, and prevent the exhaust gas from passing each of the second low-pressure stage introduction passage 94, the high-pressure stage bypass passage 95, and the low-pressure stage bypass passage 96. Thus, the exhaust gas is supplied only to the first scroll passage Pa (both of the radially inner side scroll passage Pi and the radially outer side scroll passage Po), and is not supplied to the second scroll passage Pb of the low-pressure stage turbocharger 3. Accordingly, in the low-pressure stage turbocharger 3, it is possible to improve the response of supercharging in a case where the rotation speed of the engine 7 is in the low rotation speed region while ensuring an appropriate capacity corresponding to the flow rate of exhaust gas in a case where the rotation speed of the engine 7 is in the low rotation speed region.

Figure 7C:
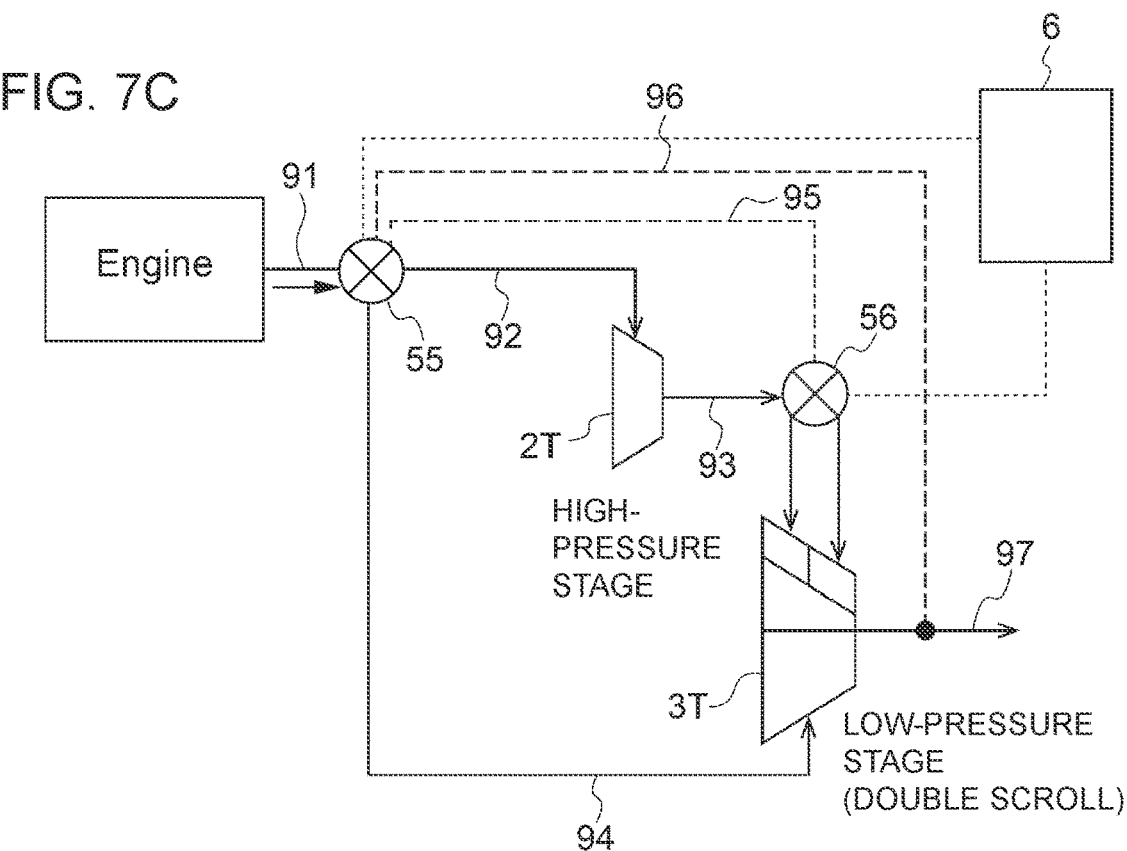
FIG. 7C is a schematic diagram for describing the operation mode of the two-stage turbo system corresponding to FIG. 5B, showing the operation mode in a case where the rotation speed of the engine is in a middle rotation speed region.

FIGS. 6C and 7C are each a diagram showing the third operation mode M3 in a case where the engine rotation speed N is in the middle rotation speed region. In this case, as shown in FIGS. 6C and 7C, the control device 6 controls the valve device 5 so as to allow exhaust gas to flow through three flow passages: the flow passage (above described exhaust gas flow passage I) for supplying exhaust gas discharged from the engine 7 to the radially inner side scroll passage Pi the first scroll passage Pa of the low-pressure stage turbine 3T, via the high-pressure stage turbine 2T; the flow passage (above described exhaust gas flow passage II) for supplying exhaust gas discharged from the engine 7 to the radially outer side scroll passage Po of the low-pressure stage turbine 3T via the high-pressure stage turbine 2T; and a flow passage (above described exhaust gas flow passage III) for supplying exhaust gas discharged from the engine 7 to the second scroll passage Pb of the low-pressure stage turbine 3T while bypassing the high-pressure stage turbine 2T. That is, in the embodiment shown in FIGS. 1 to 7E, as shown in FIGS. 6C and 7C, when the rotation speed of the engine 7 is in the middle rotation speed region, the control device 6 controls the valve device 5 so as to allow the exhaust gas to pass through each of the high-pressure stage introduction passage 92, the first low-pressure stage introduction passage 93, the radially inner side scroll passage Pi, the radially outer side scroll passage Po, and the second low-pressure stage introduction passage 94, and prevent the exhaust gas from passing each of the high-pressure stage bypass passage 95, and the low-pressure stage bypass passage 96. Thus, in the low-pressure stage turbocharger 3, the exhaust gas is supplied to the first scroll passage Pa via the high-pressure stage turbine 2T, and to both of the first scroll passage Pa and the second scroll passage Pb. Accordingly, it is possible to improve the response of supercharging with the high-pressure stage turbocharger 2 and the low-pressure stage turbocharger 3, while ensuring an appropriate capacity corresponding to the flow rate of exhaust gas in a case where the rotation speed of the engine 7 is in the middle rotation speed region.

Figure 7D:
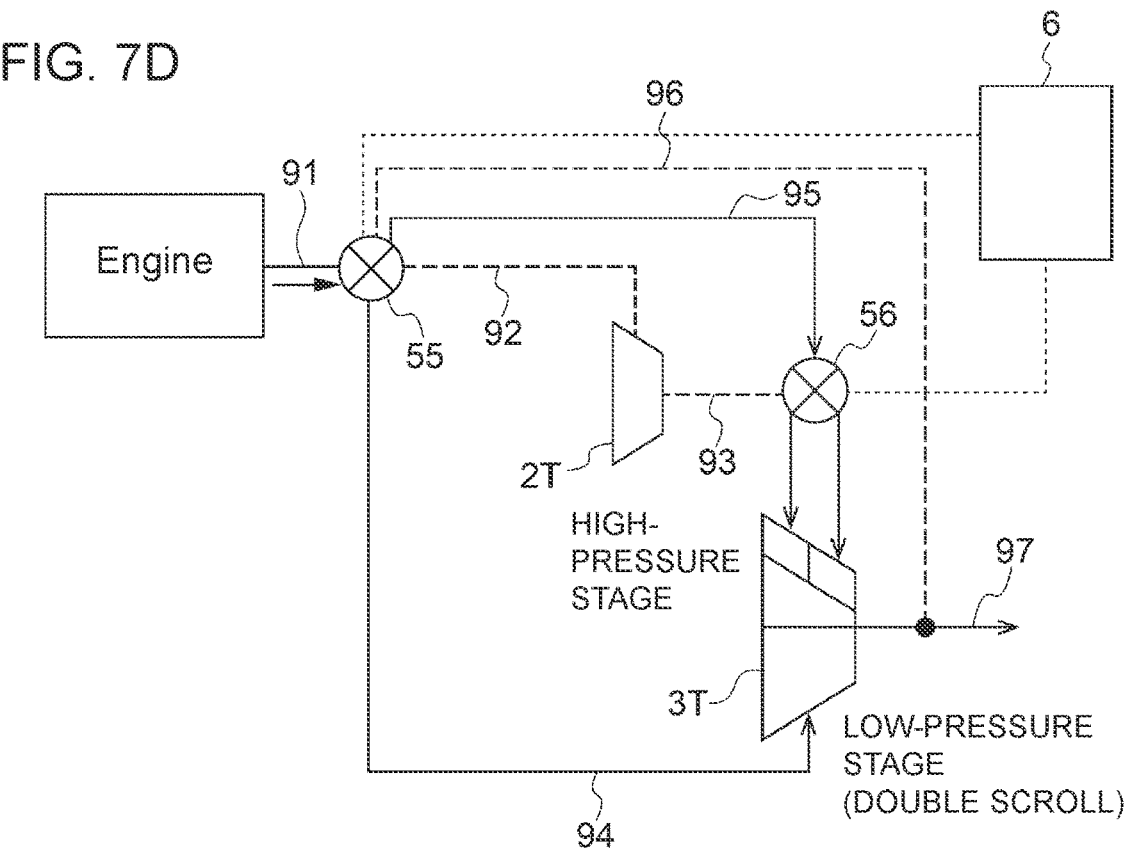
FIG. 7D is a schematic diagram for describing the operation mode of the two-stage turbo system corresponding to FIG. 5B, showing the operation mode in a case where the rotation speed of the engine is in a high rotation speed region.

FIGS. 6D and 7D are each a diagram showing the fourth operation mode M4 in a case where the engine rotation speed N is in the high rotation speed region. In this case, as shown in FIGS. 6D and 7D, the control device 6 controls the valve device 5 so as to allow exhaust gas to flow through two flow passages: the flow passage (above described exhaust gas flow passage III) for supplying exhaust gas discharged from the engine 7 to the second scroll passage Pb of the low-pressure stage turbine 3T while bypassing the high-pressure stage turbine 2T; and the flow passage (above described exhaust gas flow passage IV) for supplying exhaust gas discharged from the engine 7 to at least one of the radially inner side scroll passage Pi or the radially outer side scroll passage Po of the low-pressure stage turbine 3T (in FIGS. 1 to 7E, both) without passing through the high-pressure stage turbine 2T. That is, in the embodiment shown in FIGS. 1 to 7E, as shown in FIGS. 6D and 7D, when the rotation speed of the engine 7 is in the high rotation speed region, the control device 6 controls the valve device 5 so as to allow the exhaust gas to pass through each of the high-pressure stage bypass passage 95, the first low-pressure stage introduction passage 93, the radially inner side scroll passage Pi, the radially outer side scroll passage Po, and the second low-pressure stage introduction passage 94, and prevent the exhaust gas from passing each of the high-pressure stage introduction passage 92, and the low-pressure stage bypass passage 96. Thus, the small-sized high-pressure stage turbine 2T is in an idling state due to stop of exhaust gas supply, and the single stage turbocharging is performed by the large-sized low-pressure stage turbocharger 3. Accordingly, in a case where the rotation speed of the engine 7 is in the high rotation speed region, appropriate turbocharging can be performed in accordance with exhaust gas having a high flow rate with the low-pressure stage turbocharger 3.

Figure 7E:
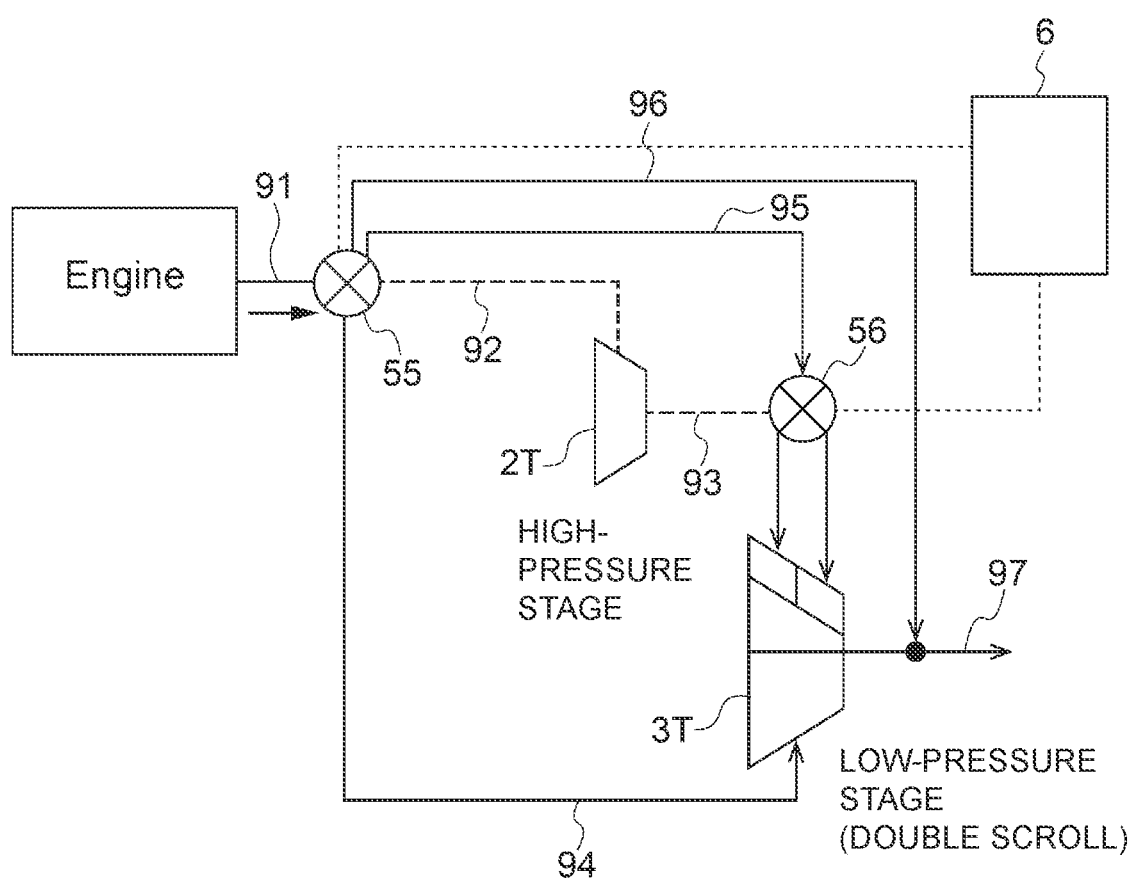
FIG. 7E is a schematic diagram for describing the operation mode of the two-stage turbo system corresponding to FIG. 5B, showing the operation mode in a case where the rotation speed of the engine is at a high rotation speed side within the high rotation speed region.

FIGS. 6E and 7E are each a diagram showing the fifth operation mode M5 in a case where the engine rotation speed N is at a high rotation speed side within the high rotation speed region. In this case, as shown in FIGS. 6E and 7E, the control device 6 controls the valve device 5 so as to allow exhaust gas to flow through three flow passages: the flow passage (above described exhaust gas flow passage III) for supplying exhaust gas discharged from the engine 7 to the second scroll passage Pb of the low-pressure stage turbine 3T while bypassing the high-pressure stage turbine 2T; the flow passage (above described exhaust gas flow passage IV) for supplying exhaust gas discharged from the engine 7 to at least one of the radially inner side scroll passage Pi or the radially outer side scroll passage Po of the low-pressure stage turbine 3T (in FIGS. 1 to 7E, both) without passing through the high-pressure stage turbine 2T; and the flow passage (above described exhaust gas flow passage V) for supplying exhaust gas discharged from the engine 7 to the low-pressure stage downstream passage 97 without passing through either one of the high-pressure stage turbine 2T or the low-pressure stage turbine 3T. That is, in the embodiment shown in FIGS. 1 to 7E, as shown in FIGS. 6E and 7E, in a case where the engine rotation speed of the engine 7 is at a high rotation speed side of a predetermined rotation speed or higher within the high rotation speed region of the engine 7, the control device 6 controls the valve device 5 so as to allow exhaust gas to pass through each of the first low-pressure stage introduction passage 93, the radially inner side scroll passage Pi, the radially outer side scroll passage Po, the second low-pressure stage introduction passage 94, the high-pressure stage bypass passage 95, and the low-pressure stage bypass passage 96, and prevent the exhaust gas from passing through the high-pressure stage introduction passage 92. If the engine rotation speed N is in the high rotation speed region, turbocharging by the high-pressure stage turbocharger 2 is not performed. The operation mode is switched to the fifth operation mode M5 if the boost pressure cannot be adjusted by the low-pressure stage turbocharger 3. Accordingly, in a case where the rotation speed of the engine is at a high rotation speed side within the high rotation speed region, it is possible to adjust the boost pressure (pressure downstream of the low-pressure stage compressor 3C) appropriately.

As described above, the operation mode of the two-stage turbo system 1 is switched in accordance with the engine rotation speed N. The method for controlling the two-stage turbo system 1 will be described with reference to FIG. 8. FIG. 8 is a flowchart of a method for controlling the two-stage turbo system 1 according to an embodiment of the present invention. The method for controlling the two-stage turbo system 1 includes, as shown in FIG. 8, a rotation speed acquisition step (S1) of obtaining the rotation speed of the engine 7 (S1), a region determination step (S2, S4, S6, S8, S9) of determining the rotation speed region of the rotation speed of the engine 7, and an extremely-low rotation speed time control step (S3) that is performed if the rotation speed of the engine 7 is in the extremely-low rotation speed region (S3). Further, the present method may further include a low rotation speed time control step (S5), a middle rotation speed time control step (S7), a first high rotation speed time control step (S10), and a second high rotation speed control step (S11). Hereinafter, the method for controlling the two-stage turbo system 1 in FIG. 8 will be described, as the control device 6 controls the valve device 5 in the embodiment shown in FIGS. 1 to 7E. Thus, the control device 6 includes functional parts for executing each of the above steps.

In step S1 of FIG. 8, the control device 6 obtains the engine rotation speed N (rotation speed acquisition step). Further, after the step S1, the control device 6 determines the rotation speed region in which the rotation speed of the engine 7 is positioned through comparison, for instance, between the obtained engine rotation speed N and a threshold of the rotation speed (the above described first threshold to third threshold), and performs the above operation modes on the basis of the determination result.

In step S2, the control device 6 determines whether the engine rotation speed N is in the extremely-low rotation speed region (region determination step). Then, if the engine rotation speed N is in the extremely-low rotation speed region, the control device 6 controls the valve device 5 to execute the first operation mode in step S3 (extremely-low rotation speed time control step). That is, in the exhaust passage 9, a flow passage (above described exhaust gas flow passage I) capable of supplying exhaust gas discharged from the engine 7 to the radially inner side scroll passage Pi of the first scroll passage Pa of the low-pressure stage turbine 3T via the high-pressure stage turbine 2T is formed (see FIGS. 6A and 7A). Then, the process advances to the next step S4. Further, the process advances to the next step S4 also if the engine rotation speed N is not in the extremely-low rotation speed region in step S2.

In step S4, the control device 6 determines whether the engine rotation speed N is in the low rotation speed region (region determination step). Then, if the engine rotation speed N is in the low rotation speed region, the control device 6 controls the valve device 5 to execute the second operation mode M2 in step S5 (low rotation speed time control step). That is, in the exhaust passage 9, two flow passage are formed including: a flow passage (above described exhaust gas flow passage I) capable of supplying exhaust gas discharged from the engine 7 to the radially inner side scroll passage Pi of the first scroll passage Pa of the low-pressure stage turbine 3T via the high-pressure stage turbine 2T; and a flow passage (above described exhaust gas flow passage II) for discharging exhaust gas from the engine 7 to the radially outer side scroll passage Po of the first scroll passage Pa of the low-pressure stage turbine 3T via the high-pressure stage turbine 2T (see FIGS. 6B and 7B). Then, the process advances to the next step S6. Further, the process advances to the next step S6 also if the engine rotation speed N is not in the low rotation speed region in step S4.

In step S6, the control device 6 determines whether the engine rotation speed N is in the middle rotation speed region (region determination step). Then, if the engine rotation speed N is in the middle rotation speed region, the control device 6 controls the valve device 5 to execute the third operation mode M3 in step S7 (middle rotation speed time control step). That is, in the exhaust passage 9, three flow passages are formed, namely, the above described exhaust gas flow passage I, the above described exhaust gas flow passage II, and a flow passage (above described exhaust gas flow passage III) capable of supplying exhaust gas discharged from the engine 7 to the second scroll passage Pb of the low-pressure stage turbine 3T while bypassing the high-pressure stage turbine 2T (see FIGS. 6C and 7C). Then, the process advances to the next step S8. Further, the process advances to the next step S8 also if the engine rotation speed N is not in the middle rotation speed region in step S6.

In step S8, the control device 6 determines whether the engine rotation speed N is in the high rotation speed region (region determination step). Further, if the engine rotation speed N is in the high rotation speed region, in step S9, the control device 6 determines whether the engine rotation speed N is not lower than a predetermined rotation speed (region determination step). In step S9, if the engine rotation speed N is lower than the predetermined rotation speed, the control device 6 controls the valve device 5 to execute the fourth operation mode M4 in step S10 (first high rotation speed time control step). That is, in the exhaust passage 9, two flow passages are formed, namely, the above described exhaust gas flow passage III, and a flow passage (above described exhaust gas flow passage IV) capable of supplying exhaust gas discharged from the engine 7 to both of the radially inner side scroll passage Pi and the radially outer side scroll passage Po of the low-pressure stage turbine 3T without passing through the high-pressure stage turbine 2 (see FIGS. 6D and 7D). Then the flow of FIG. 8 is ended.

In contrast, if the engine rotation speed N is not lower than the predetermined rotation speed in step S9, the control device 6 controls the valve device 5 to execute the fifth operation mode M5 in step S11 (second high rotation speed time control step). That is, in the exhaust passage 9, a flow passage (above described exhaust gas flow passages V) capable of supplying exhaust gas discharged from the engine 7 to the low-pressure stage downstream passage 97 of the low-pressure stage turbine 3T without passing through either one of the high-pressure stage turbine 2T or the low-pressure stage turbine 3T is added to the flow passages formed when the engine rotation speed is determined to be in the high rotation speed region (exhaust gas flow passage III and exhaust gas flow passage IV), and thereby three flow passages are formed in total (see FIGS. 6E and 7E). Then the flow of FIG. 8 is ended.

In the embodiment shown in FIG. 8, after the execution of steps S3, S5, and S7, the subsequent steps are executed. Nevertheless, this is not limitative, and the flow of FIG. 8 may be ended after performing steps S3, S7, and S5.

Embodiments of the present invention were described in detail above, but the present invention is not limited thereto, and various amendments and modifications may be implemented.

DESCRIPTION OF REFERENCE NUMERALS

1 Two-stage turbo system
2 High-pressure stage turbocharger
2C High-pressure stage compressor
2T High-pressure stage turbine
2*m* Shaft of high-pressure stage turbocharger
2S Scroll part of high-pressure stage turbocharger
3 Low-pressure stage turbocharger
3C Low-pressure stage compressor
3T Low-pressure stage turbine
3S Scroll part of low-pressure stage turbocharger
3*m* Shaft of low-pressure stage turbocharger
31 Turbine wheel
31*r* Wheel housing chamber
32 Inlet of low-pressure stage turbine
33 Outlet of low-pressure stage turbine
34*a* First tongue
34*b* Second tongue
Pa First scroll passage
Pad Downstream portion
Pau Upstream portion
Pb Second scroll passage
5 Valve device
51 First valve
52 Second valve
53 Third valve
54 Fourth valve
55 Fifth valve
56 Sixth valve
6 Control device
7 Engine
8 Intake passage
81 Main intake passage
82 Intake manifold
83 High-pressure stage compressor bypass passage
84 Inter cooler
85 Compressor bypass valve
9 Exhaust passage
91 Exhaust manifold
92 High-pressure stage introduction passage
93 First low-pressure stage introduction passage
94 Second low-pressure stage introduction passage
95 High-pressure stage bypass passage
96 Low-pressure stage bypass passage
97 Low-pressure stage downstream passage
M1 First operation mode (extremely-low rotation speed region of engine)
M2 Second operation mode (low rotation speed region of engine)
M3 Third operation mode (middle rotation speed region of engine)
M4 Fourth operation mode (high rotation speed region of engine)
M5 Fifth operation mode (high rotation speed region of engine)
E Nozzle flow passage
Ra First range
Rb Second range
RL Boundary
C Compressor of turbocharger
T Turbine of turbocharger
m Shaft (rotational shaft) of turbocharger
L Rotational axis of low-pressure stage turbine
N Engine rotation speed

The invention claimed is:

1. A two stage turbo system, comprising:
a high-pressure stage turbocharger including a high-pressure stage turbine disposed in an exhaust passage of an engine; and
a low-pressure stage turbocharger including a low-pressure stage turbine disposed on a downstream side of the high-pressure stage turbine in the exhaust passage and which is larger in size than the high-pressure stage turbocharger,
wherein the low-pressure stage turbocharger includes a scroll part for introducing exhaust gas into a nozzle flow passage of the low-pressure stage turbine,
wherein the scroll part includes at least two scroll passages including a first scroll passage and a second scroll passage, and is configured such that a first range of the nozzle flow passage into which the exhaust gas flowing through the first scroll passage is introduced does not overlap with a second range of the nozzle flow passage into which the exhaust gas flowing through the second scroll passage is introduced, in a circumferential direction of the nozzle flow passage,
wherein the first scroll passage includes:
a division wall disposed along a flow direction of the exhaust gas within a predetermined range in the first scroll passage, the division wall dividing the first scroll passage into a radially outer side scroll passage and a radially inner side scroll passage positioned on a radially inner side of the radially outer side scroll passage, and having a communication hole which brings the radially outer side scroll passage and the radially inner side scroll passage into communication; and
a flow-rate control valve disposed on an upstream side of the division wall, for adjusting a flow rate of the exhaust gas flowing through the radially outer side scroll passage and the radially inner side scroll passage,
wherein the second scroll passage consists only of a single scroll passage; and
wherein the exhaust passage includes:

a high-pressure stage introduction passage connecting the engine and an inlet of the high-pressure stage turbine;
a first low-pressure stage introduction passage connecting an outlet side of the high-pressure stage turbine and the first scroll passage of the low-pressure stage turbine; and
a second low-pressure stage introduction passage bypassing the high-pressure stage turbine and connecting the engine and the second scroll passage of the low-pressure stage turbine.

2. The two stage turbo system according to claim 1, wherein the flow-rate control valve is configured such that an entire amount of the exhaust gas flowing into the first scroll passage flows through the radially inner side scroll passage if the flow-rate control valve is in a fully-closed state, and that the exhaust gas flowing into the first scroll passage flows through both of the radially inner side scroll passage and the radially outer side scroll passage if the flow-rate control valve is in a valve-open state.

3. The two stage turbo system according to claim 1, wherein the exhaust passage further includes:
a high-pressure stage bypass passage bypassing the high-pressure stage turbine and connecting the engine and the first scroll passage of the low-pressure stage turbine, and
a low-pressure stage bypass passage which bypasses the low-pressure stage turbine and which connects an upstream side and a downstream side of the low-pressure stage turbine,
wherein the two-stage turbo system further includes a valve device capable of adjusting proportion of a flow rate of the exhaust gas passing through each of the high-pressure stage introduction passage, the first low-pressure stage introduction passage, the radially inner side scroll passage, the radially outer side scroll passage, the second low-pressure stage introduction passage, the high-pressure stage bypass passage, and the low-pressure stage bypass passage.

4. The two stage turbo system according to claim 3, wherein the valve device includes:
the flow-rate control valve;
a first valve disposed in the high-pressure stage introduction passage;
a second valve disposed in the second low-pressure stage introduction passage;
a third valve disposed in the high-pressure stage bypass passage; and
a fourth valve disposed in the low-pressure stage bypass passage.

5. The two stage turbo system according to claim 3, wherein the valve device includes:
the flow-rate control valve; and
a fifth valve capable of adjusting the flow rate of exhaust gas flowing through each of the high-pressure stage introduction passage, the second low-pressure stage introduction passage, the high-pressure stage bypass passage, and the low-pressure stage bypass passage.

6. The two stage turbo system according to claim 3, further comprising a control device configured to control the valve device in accordance with a rotation speed of the engine.

7. The two stage turbo system according to claim 6, when the engine speed includes four regions consisting of:
a high rotation speed region in which the rotation speed of the engine is highest among the four regions;
a middle rotation speed region in which the rotation of the engine is lower than the high rotation speed region;
a low rotation speed region in which the rotation speed of the engine is lower than the middle rotation speed region:
an extremely low rotation speed region in which the rotation speed of the engine is lower than the low rotation speed region;
wherein the control device is configured to, if the rotation speed of the engine is in the extremely low rotation speed region, allow the exhaust gas to pass through each of the high-pressure stage introduction passage, the first low-pressure stage introduction passage, and the radially inner side scroll passage, and prevent the exhaust gas from passing through each of the radially outer side scroll passage, the second low-pressure stage introduction passage, the high-pressure stage bypass passage, and the low-pressure stage bypass passage.

8. The two stage turbo system according to claim 6, when the engine speed includes four regions consisting of:
a high rotation speed region in which the rotation speed of the engine is highest among the four regions;
a middle rotation speed region in which the rotation of the engine is lower than the high rotation speed region;
a low rotation speed region in which the rotation speed of the engine is lower than the middle rotation speed region:
an extremely low rotation speed region in which the rotation speed of the engine is lower than the low rotation speed region;
wherein the control device is configured to, if the rotation speed of the engine is in the low rotation speed region, control the valve device so as to allow the exhaust gas to pass through each of the high-pressure stage introduction passage, the first low-pressure stage introduction passage, the radially inner side scroll passage, and the radially outer side scroll passage, and prevent the exhaust gas from passing through each of the second low-pressure stage introduction passage, the high-pressure stage bypass passage, and the low-pressure stage bypass passage.

9. The two stage turbo system according to claim 6, when the engine speed includes four regions consisting of:
a high rotation speed region in which the rotation speed of the engine is highest among the four regions;
a middle rotation speed region in which the rotation of the engine is lower than the high rotation speed region;
a low rotation speed region in which the rotation speed of the engine is lower than the middle rotation speed region:
an extremely low rotation speed region in which the rotation speed of the engine is lower than the low rotation speed region;
wherein the control device is configured to, if the rotation speed of the engine is in the middle rotation speed region, control the valve device so as to allow the exhaust gas to pass through each of the high-pressure stage introduction passage, the first low-pressure stage introduction passage, the radially inner side scroll passage, the radially outer side scroll passage, and the second low-pressure stage introduction passage, and prevent the exhaust gas from passing through each of the high-pressure stage bypass passage and the low-pressure stage bypass passage.

10. The two stage turbo system according to claim 6, when the engine speed includes four regions consisting of:
   a high rotation speed region in which the rotation speed of the engine is highest among the four regions;
   a middle rotation speed region in which the rotation of the engine is lower than the high rotation speed region;
   a low rotation speed region in which the rotation speed of the engine is lower than the middle rotation speed region:
   an extremely low rotation speed region in which the rotation speed of the engine is lower than the low rotation speed region;
   wherein the control device is configured to, if the rotation speed of the engine is in the high rotation speed region, control the valve device to allow the exhaust gas to pass through each of the high-pressure stage bypass passage, the first low-pressure stage introduction passage, the radially inner side scroll passage, the radially outer side scroll passage, and the second low-pressure stage introduction passage, and prevent the exhaust gas from passing through each of the high-pressure stage introduction passage and the low-pressure stage bypass passage.

11. The two stage turbo system according to claim 10, wherein the control device is configured to, if the rotation speed of the engine is not lower than a predetermined rotation speed within the high rotation speed region, control the valve device to allow the exhaust gas to pass through each of the high-pressure stage bypass passage, the first low-pressure stage introduction passage, the radially inner side scroll passage, the radially outer side scroll passage, the second low-pressure stage introduction passage, and the low-pressure stage bypass passage, and prevent the exhaust gas from passing through the high-pressure stage introduction passage.

12. A method of controlling the two stage turbo system according to claim 6, which includes a high-pressure stage turbocharger including a high-pressure stage turbine disposed in an exhaust passage of an engine and a low-pressure stage turbocharger which includes a low-pressure stage turbine disposed downstream of the high-pressure stage turbine in the exhaust passage and which is larger in size than the high-pressure stage turbocharger,
   when the engine speed includes four regions consisting of:
   a high rotation speed region in which the rotation speed of the engine is highest among the four regions;
   a middle rotation speed region in which the rotation of the engine is lower than the high rotation speed region;
   a low rotation speed region in which the rotation speed of the engine is lower than the middle rotation speed region:
   an extremely low rotation speed region in which the rotation speed of the engine is lower than the low rotation speed region;
   the method comprising:
   a rotation speed acquisition step of obtaining a rotation speed of the engine;
   a region determination step of determining a rotation speed region of the rotation speed of the engine; and
   a low rotation speed region control step of controlling, if the rotation speed of the engine is in the extremely-low rotation speed region or the low rotation speed region, the valve device so as to allow exhaust gas to pass through a first scroll passage of the low-pressure stage turbocharger via the high-pressure stage turbine, and prevent the exhaust gas from passing through a second scroll passage of the low-pressure stage turbocharger.

13. The method of controlling the two-stage turbo system according to claim 12, further comprising an extremely-low rotation speed time control step of controlling, if the rotation speed of the engine is in the extremely-low rotation speed region, the valve device so as to allow the exhaust gas to pass through a radially inner side scroll passage of the first scroll passage of the low-pressure stage turbocharger via the high-pressure stage turbine, and prevent the exhaust gas from passing through a radially outer side scroll passage of the first scroll passage of the low-pressure stage turbocharger.

14. The method of controlling the two-stage turbo system according to claim 12, further comprising a low rotation speed time control step of controlling, if the rotation speed of the engine is in the low rotation speed region, the valve device so as to allow the exhaust gas to pass through both of the radially inner side scroll passage and the radially outer side scroll passage of the first scroll passage of the low-pressure stage turbocharger via the high-pressure stage turbine, and prevent the exhaust gas from passing through the second scroll passage.

15. The method of controlling the two-stage turbo system according to claim 12, further comprising the middle rotation speed time control step of controlling, if the rotation speed of the engine is in a middle rotation speed region, the valve device so as to allow the exhaust gas to pass through both of the radially inner side scroll passage and the radially outer side scroll passage of the first scroll passage of the low-pressure stage turbocharger via the high-pressure stage turbine, and prevent the exhaust gas from passing through the second scroll passage.

16. A two stage turbo system, comprising:
   a high-pressure stage turbocharger including a high-pressure stage turbine disposed in an exhaust passage of an engine; and
   a low-pressure stage turbocharger including a low-pressure stage turbine disposed on a downstream side of the high-pressure stage turbine in the exhaust passage and which is larger in size than the high-pressure stage turbocharger,
   wherein the low-pressure stage turbocharger includes a scroll part for introducing exhaust gas into a nozzle flow passage of the low-pressure stage turbine,
   wherein the scroll part includes at least two scroll passages including a first scroll passage and a second scroll passage, and is configured such that a first range of the nozzle flow passage into which the exhaust gas flowing through the first scroll passage is introduced does not overlap with a second range of the nozzle flow passage into which the exhaust gas flowing through the second scroll passage is introduced, in a circumferential direction of the nozzle flow passage,
   wherein the first scroll passage includes:
   a division wall disposed along a flow direction of the exhaust gas within a predetermined range in the first scroll passage, the division wall dividing the first scroll passage into a radially outer side scroll passage and a radially inner side scroll passage positioned on a radially inner side of the radially outer side scroll passage, and having a communication hole which brings the radially outer side scroll passage and the radially inner side scroll passage into communication; and a flow-rate control valve disposed on an upstream side of the division wall, for adjusting a flow rate of the exhaust gas flowing through the radially outer side scroll passage and the radially inner side scroll passage, wherein the exhaust passage includes:
- a high-pressure stage introduction passage connecting the engine and an inlet of the high-pressure stage turbine;
- a first low-pressure stage introduction passage connecting an outlet side of the high-pressure stage turbine and the first scroll passage of the low-pressure stage turbine; and
- a second low-pressure stage introduction passage bypassing the high-pressure stage turbine and connecting the engine and the second scroll passage of the low-pressure stage turbine, wherein the exhaust passage further includes:
- a high-pressure stage bypass passage bypassing the high-pressure stage turbine and connecting the engine and the first scroll passage of the low-pressure stage turbine, and
- a low-pressure stage bypass passage which bypasses the low-pressure stage turbine and which connects an upstream side and a downstream side of the low-pressure stage turbine, wherein the two-stage turbo system further includes a valve device capable of adjusting proportion of a flow rate of the exhaust gas passing through each of the high-pressure stage introduction passage, the first low-pressure stage introduction passage, the radially inner side scroll passage, the radially outer side scroll passage, the second low-pressure stage introduction passage, the high-pressure stage bypass passage, and the low-pressure stage bypass passage, and wherein the valve device includes:
- the flow-rate control valve;
- a first valve disposed in the high-pressure stage introduction passage;
- a second valve disposed in the second low-pressure stage introduction passage;
- a third valve disposed in the high-pressure stage bypass passage; and
- a fourth valve disposed in the low-pressure stage bypass passage.

17. The two stage turbo system according to claim 16, wherein the flow-rate control valve is configured such that an entire amount of the exhaust gas flowing into the first scroll passage flows through the radially inner side scroll passage if the flow-rate control valve is in a fully-closed state, and that the exhaust gas flowing into the first scroll passage flows through both of the radially inner side scroll passage and the radially outer side scroll passage if the flow-rate control valve is in a valve-open state.

* * * * *